United States Patent [19]
Gharachorloo et al.

[11] Patent Number: 5,488,684
[45] Date of Patent: Jan. 30, 1996

[54] METHOD AND APPARATUS FOR RENDERING TRIMMED PARAMETRIC SURFACES

[75] Inventors: Nader Gharachorloo, Ossining; William L. Luken, Ulster Park, both of N.Y.

[73] Assignee: International Business Machines Corporation, Armonk, N.Y.

[21] Appl. No.: 311,701

[22] Filed: Sep. 23, 1994

Related U.S. Application Data

[63] Continuation of Ser. No. 86,750, Jul. 1, 1993, abandoned, which is a continuation of Ser. No. 620,965, Nov. 30, 1990, abandoned.

[51] Int. Cl.⁶ .................................................. G06T 15/30
[52] U.S. Cl. ............................................ 395/123; 395/134
[58] Field of Search .................................. 395/123, 134, 395/141, 142, 119

[56] References Cited

U.S. PATENT DOCUMENTS

| | | | |
|---|---|---|---|
| 4,760,548 | 7/1988 | Baker et al. | 364/718 |
| 4,912,659 | 3/1990 | Liang | 395/134 |
| 4,999,789 | 3/1991 | Fiasconaro | 395/134 X |
| 5,226,115 | 7/1993 | Fiasconaro | 395/141 |
| 5,278,948 | 1/1994 | Luken, Jr. | 395/123 |

FOREIGN PATENT DOCUMENTS 0277832  8/1988  European Pat. Off. .

OTHER PUBLICATIONS

Shantz et al., "Rendering Trimmed NURBS with Adaptive Forward Differences", Aug. 1988, Computer Graphics, pp. 189–198.

Rockwood et al., "Real–Time Rendering of Trimmed Surfaces", Jul. 1989, Computer Graphics, pp. 107–116.

*Primary Examiner*—Mark K. Zimmerman
*Attorney, Agent, or Firm*—Mark S. Walker; Heslin & Rothenberg

[57] ABSTRACT

A method and apparatus for rendering a trimmed NURBS surface representing a mapping from U and V parametric coordinates to X, Y and Z geometric coordinates and having a trimming region bound by a trim polyline. The UV parametric surface is divided into contiguous V and V intervals intersecting to form UV rectangles, the trim polyline intersecting a subset of the UV rectangles to divide each of the UV rectangles of the subset into at least one polygon lying within the region and at least one polygon lying outside of the trimming region. For each UV rectangle intersected by the trim polyline, the vertices of each polygon within the trimming region formed by the intersection of the trim polyline and the UV rectangle is determined, and vertex data for the vertices so determined is provided to a concave polygon processor to render the polygon. For each V interval intersected by the trim polyline, polyline data stored in a global memory is read by the graphics processor, and the polyline defined by the read data clipped to form a V-clipped polyline defined by V-clipped data which is stored in local memory associated with the processor. The graphics processor then processes the V interval using the V-clipped polyline data stored in local memory.

19 Claims, 24 Drawing Sheets

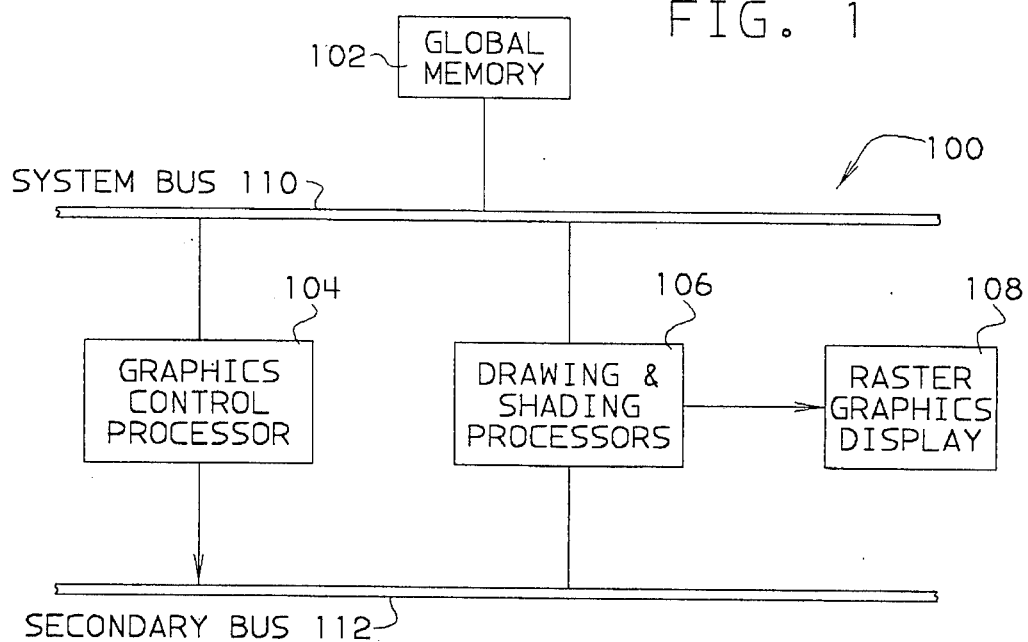
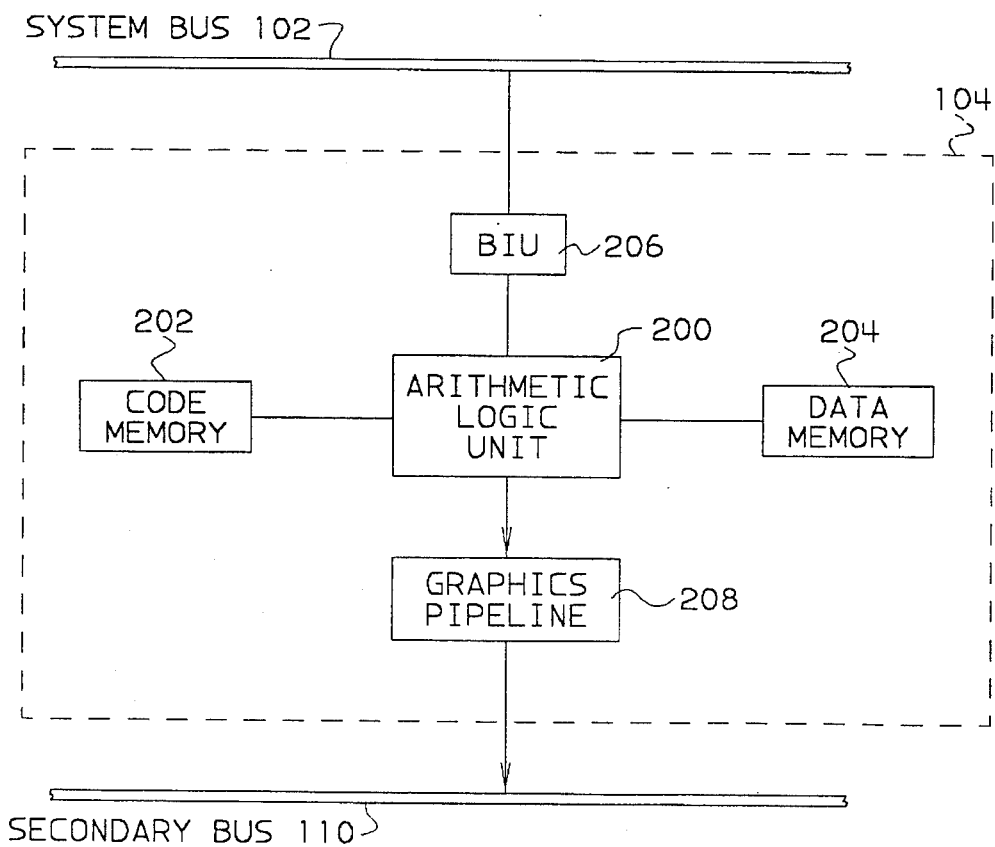

FIG. 3

| | | |
|---|---|---|
| 300 | HEADER | (1 WORD) |
| 302 | STATUS FLAGS | (1 WORD) |
| 304 | U ORDER (KU) | (1 WORD) |
| 306 | U NUMBER (NU) | (1 WORD) |
| 308 | V ORDER (KV) | (1 WORD) |
| 310 | V NUMBER (NV) | (1 WORD) |
| 312 | LENGTH OF TRIM CURVE DATA | (1 WORD) |
| 314 | TRIM CONTOUR 1 | |
| 316 | (TRIM CONTOUR 2) | |
| 318 | (...) | |
| 320 | U KNOT VECTOR | (NU+KU WORDS) |
| 322 | U TESSELLATION VECTOR | (NU−KU+1 WORDS) |
| 324 | V KNOT VECTOR | (NV+KV WORDS) |
| 326 | V TESSELLATION VECTOR | (NV−KV+1 WORDS) |
| 328 | CONTROL POINT MATRIX | ((3 OR 4)*NU*NV WORDS) |

| | 1 | 2 | | Nu |
|---|---|---|---|---|
| TOP (V = V1) | X Y<br>Z W<br>DX/DV DW/DV<br>DY/DV DZ/DV | X Y<br>Z W<br>DX/DV DY/DV<br>DZ/DV DW/DV | --- | X Y ⟵612<br>Z W<br>DX/DV DY/DV<br>DZ/DV DW/DV |
| BOTTOM (V = V3) | X Y<br>Z W<br>DX/DV DY/DV<br>DZ/DV DW/DV | X Y<br>Z W<br>DX/DV DY/DV<br>DZ/DV DW/DV | --- | X Y ⟵614<br>Z W<br>DX/DV DY/DV<br>DZ/DV DW/DV |

METHOD AND APPARATUS FOR RENDERING TRIMMED PARAMETRIC SURFACES

This application is a continuation, of application Ser. No. 08/086,750, filed Jul. 1, 1993, now abandoned, which itself is a continuation of application Ser. No. 07/620,965, filed Nov. 30, 1990, now abandoned.

BACKGROUND OF THE INVENTION

1. Field of the Invention

This invention relates to a method and apparatus for rendering trimmed parametric surfaces, especially trimmed NURBS surfaces, in a graphics system such as one in a high-performance graphics workstation.

2. Description of the Related Art

Graphics entities (also known as primitive elements, or primitives) consist of lines, curves, polygons, curved surfaces, and other two-dimensional (2D) and three-dimensional (3D) entities. These entities are usually stored in a form which efficiently encodes the basic parameters (endpoints of a line, center and radius of a circle, etc.), but is not directly representable on a raster-scan display, in which successive pixels, or pels, are illuminated as appropriate for the entity being represented. To "render" a graphics entity is to convert the entity from its high-level form ultimately to pixel data, which is stored in a frame buffer having a location for each pixel being displayed.

As disclosed in U.S. Pat. No. 5,278,948, one type of graphic entity, referred to as a NURBS (Non-Uniform Rational B-Spline) surface, is a particularly defined mapping from a 2D parametric coordinate space (U,V) to a 3D geometric coordinate space (X,Y,Z) in which the entity is actually viewed. An example of such a mapping might be a sphere, with U representing latitude and V representing longitude. More typically, however, NURBS representations would be used for surfaces (such as the wings or fuselage on an aircraft) that cannot be resolved into spherical, cylindrical or planar surfaces.

As described in the above-identified copending application, to facilitate the rendering process, the UV parameter space is divided, or tessellated, into contiguous U and V strips, or intervals, with the intervals intersecting to form a 2D array of UV rectangles. The NURBS surface is evaluated at the vertices of the UV rectangles by determining, for each vertex, the X, Y and Z geometric coordinates as well as the X, Y and Z components of a normal vector to the NURBS surface at that point. The vertex data for each UV rectangle is then set to a polygon processor, which processes the vertex data in a conventional manner to render the polygon. Thus, the polygon processor may generate edges of a defined color, fill the interior of the polygon with a predefined color, which may be different from the edge color, or shade the interior of the polygon, using the normal vector data to determining shading.

The NURBS surfaces described in the above-identified application are untrimmed surfaces, i.e. surfaces whose extents are defined simply by minimum and maximum values of the parametric coordinates U and V. It would be desirable also to be able to render trimmed NURBS surfaces, i.e. surfaces whose extent in the UV parametric coordinate space is defined by a trimming curve in that space.

A known method of rendering trimmed NURBS surfaces, which may be used in conjunction with the method described in the above-identified copending application, is to convert the trimming curve to a trim polyline (more particularly, a trim polygon enclosing a trimming region) approximating the trimming curve in parametric coordinate space. The trimming region bound by this trim polyline is made up of complete UV rectangles together with polygons of irregular shape formed by the intersection of the trimming region, bound by the trim polyline, with the UV rectangles along the periphery of the trimming region. The complete UV rectangles are rendered by the polygon processor in the usual manner. The irregular polygons, on the other hand, are recursively subdivided into rectangles which, in the aggregate, approximate the original irregular polygon. These smaller rectangles, whose dimensions in XYZ geometric coordinate space approximate those of a pixel, are then sent to the polygon processor.

While this method is capable of rendering trimmed NURBS surfaces, it would be desirable to have a method that does not necessitate the generation of numerous tiny polygons. Not only is the generation of such polygons a time-consuming act in itself, but the polygons generated also burden the polygon processor further down the graphics pipeline.

SUMMARY OF THE INVENTION

In one aspect, our invention contemplates a method and apparatus for rendering a trimmed parametric surface, such as a NURBS surface, representing a mapping from U and V parametric coordinates to X, Y and Z geometric coordinates and having a trimming region bound by a trim polyline. The UV parametric surface is divided into contiguous U and V intervals intersecting to form UV rectangles, the trim polyline intersecting a subset of the UV rectangles to divide each of the rectangles of the subset into at least one polygon lying within the trimming region and at least one polygon lying outside of the trimming region. For each UV rectangle intersected by the trim polyline, the vertices of each polygon lying within the trimming region formed by the intersection of the trim polyline and the UV rectangle are determined, and vertex data for the vertices so determined is provided to a concave polygon processor to render the polygon.

Use of concave polygons in place of recursive subdivision greatly simplifies the processing of a surface in the regions close to the trimming curves. In most cases, this will lead to a significant increase in performance because it will not be necessary to subdivide the parameter space down to single pixels. In addition to eliminating the work required to generate many tiny polygons, it will relieve the graphics pipeline of the burden of processing all of the extra vertices represented by these polygons. In some cases the processing of trimmed surfaces may be improved by a factor of 3 or more by this improvement. This use of concave polygons also provides accurate representations of the edges of trimmed surfaces, and makes it possible to support edge line styles for trimmed surfaces, because edges will be defined by vectors instead of many small polygons.

Another aspect of our invention contemplates a method and apparatus for rendering a trimmed parametric surface such as a NURBS surface in a graphics system having a global memory in which trim polyline data is stored and a local memory associated with a graphics processor. In accordance with this aspect of our invention, the UV parametric surface is first divided into a plurality of contiguous V intervals. For each V interval intersected by the trim polyline, the polyline data stored in the global memory is read by the graphics processor, and the polyline defined by the read data clipped to form a V-clipped polyline defined by V-clipped data which is stored in local memory. The graphics processor then processes the V interval using the V-clipped polyline data stored in local memory.

Transfer of trim curve vertices from global memory for each V interval provides two important benefits. First, it increases the maximum complexity of the trimming curves that can be supported by the limited working space in local memory. In the known method referred to above, the entire set of trimming curve vertices are copied into local memory. If this set of data does not fit within local memory, it is necessary to redefine the surface as a set of adjacent surfaces. With the new method described here, only the portions of the trimming curves falling within a single V interval need to be stored in local memory. If the largest such set of trimming curve data does not fit within local memory, the size of the V intervals may be reduced by changing the surface approximation quality until the trimming curve data contained within each V interval can be accommodated. This allows surfaces with complex trimming curves to be handled without breaking a surface into simpler pieces.

As a second benefit, this change allows the process of clipping the trimming curves to a UV rectangle to be performed in two steps. In the first step, the vertices are clipped to the V interval and the resulting clipped vertices, including any new vertices created where trim curves cross the V boundaries, are stored in local memory. In the second step, the resulting vectors are clipped to the U interval. The XYZ coordinates and normal vectors of the resulting vertices are then sent to the graphics pipeline.

BRIEF DESCRIPTION OF THE DRAWINGS

FIG. 1 is a schematic block diagram of a graphics system which may be used to practice the present invention.

FIG. 2 is a schematic block diagram of the graphics control processor shown in FIG. 1.

FIG. 3 illustrates the format used to store data specifying a trimmed NURBS surface in the global memory shown in FIG. 1.

FIG. 6A further illustrates the control point stacks stored in the portion of local memory shown in FIG. 6.

FIG. 9, comprising

FIG. 12, comprising

DESCRIPTION OF THE PREFERRED EMBODIMENT

1. Introduction

The essential characteristics of NURBS (Non-Uniform Rational B-Spline) curves and surfaces are described in commonly assigned U.S. Pat. No. 5,317,682 and U.S. Pat. No. 5,278,948, the specifications of which are incorporated herein by reference, as well as in "An Introduction to Splines for use in Computer Graphics and Geometric Modelling", by R. H. Bartels, J. C. Beatty and B. A. Basky (Morgan Kaufman, 1987). As described in those applications, a NURBS curve is a particular mapping from a one-dimensional (1D) parameter space to a 2D or 3D geometric coordinate space, while a NURBS surface is a particular mapping from a 2D parameter space to a 3D geometric coordinate space. Thus, referring to FIG. 13, a rectangular portion of a UV parameter space bounded by minimum and maximum U parameters Umin and Umax and V parameters Vmin and Vmax is shown as it might exist in XYZ coordinate space.

Figure 13:
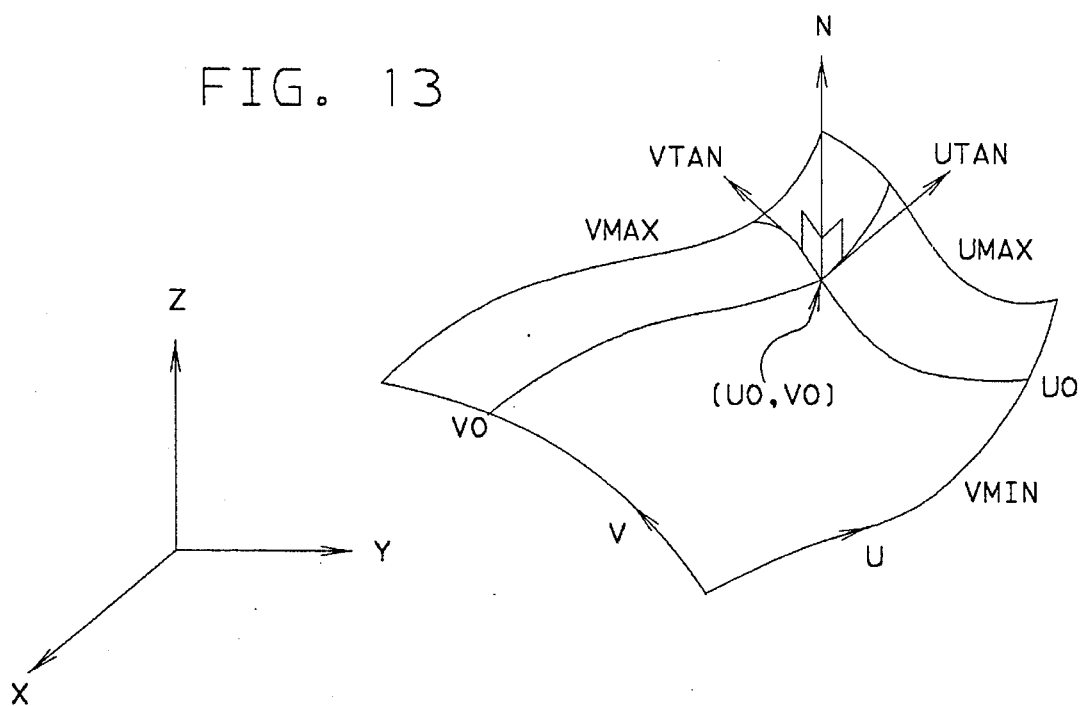
FIG. 13 is an illustration of an untrimmed NURBS surface as it might appear in XYZ geometric coordinate space.

As shown in FIG. 13, a given point (U0, V0) in parameter space lies at the intersection of two lines U=U0 and V=V0 that are perpendicular in that space. U and V tangent vectors Utan and Vtan, which are tangent to the lines U=U0 and V=V0 at (U0, V0), may be defined by the vector equations

*Utan=dr/dU*

*Vtan=dr/dV* evaluated at (U0, V0), where r is the displacement (X, Y, Z) of a point in the geometric coordinate space. A normal vector N, perpendicular to Utan and Vtan at (U0, V0), may in turn be defined as the vector product

*N=Utan×Vtan.*

Typically, when evaluating a point in parametric coordinate space, the X, Y and Z components of the normal vector N are determined in addition to the X, Y and Z coordinates of the point itself, since these components are used to control surface shading.

Figure 14:
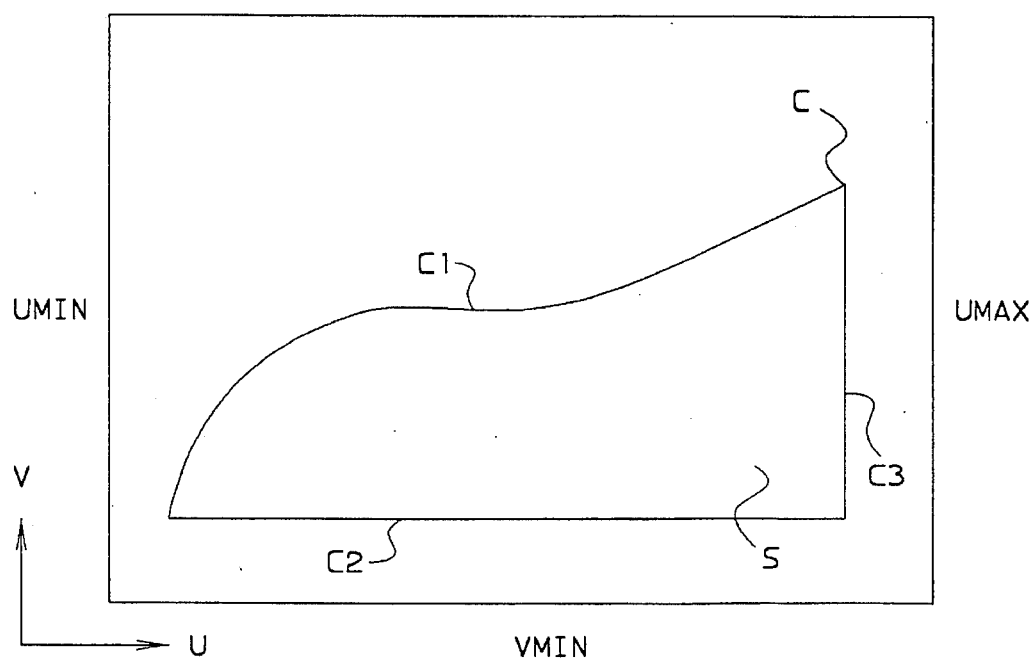
FIG. 14 illustrates a typical trimming contour, consisting of a plurality of trimming curves, in UV parameter space.

A trimmed NURBS surface is one that is bound by a defined trimming contour in UV parameter space rather than by minimum and maximum U and V parameters as in FIG. 13. FIG. 14 shows an example of a trimmed NURBS surface S bounded by a trimming contour C comprising contiguous curves C1, C2 and C3. Trimmed NURBS surfaces may be represented using the Programmer's Hierarchical Interactive Graphics Standard (PHIGS) with extensions for lighting and shading (PHIGS+, PHIGS–BR, or PHIGS–PLUS).

Figure 14A:
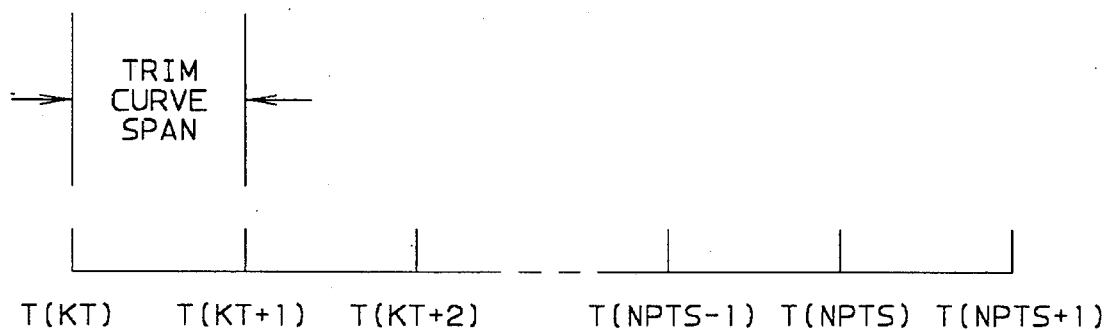
FIG. 14A illustrates the relationship between the trim curve spans and the knot values defining the trim curve.

In general the interior of a trimming contour defines a trimming region. For topologically more complex trimming regions, multiple trimming contours may be used, with the resultant trimming region being defined as the symmetric difference, or exclusive OR combination, of the constituent regions. Thus, as shown in FIG. 14E, two trimming contours C1 and C2 may have disjoint trimming regions R1 and R2 which form a resultant trimming region consisting of the two disjoint parts or, as shown in FIG. 14F, the trimming region of one contour C1 may encompass the region R2 of another contour C2, so that the resultant region R is doughnut shaped.

Each of trimming curves C1–C3 may be a NURBS curve, i.e. a particular mapping between values of the trim curve parameter T and points in UV parameter space. Thus, referring to FIG. 14B, a trim curve C having a minimum parameter value tmin and maximum parameter value tmax is shown as it might exist in UV parameter space. In this instance, although the quantities U and V are referred to as parameters since they are ultimately mapped into XYZ coordinate space, they are here dependent variables, determined by the trim curve parameter T.

In general, a particular span (the term "span" to be defined) of a NURBS curve in UV space has the rational parametric form

*U=WU(T)/W(T)*

*V=WV(T)/W(T)* where WU(T), WV(T) and W(T) are polynomials in T of order kt. The order kt is mt+1, where mt is the highest power of the T parameter in the above parametric equations. If W(T) is a constant (e.g. 1) then these equations reduce to the nonrational form

*U=U(T)*

*V=V(T)* where U(T) and V(T) are polynomials in T of order kt.

These parametric equations for U and V are conventionally defined implicitly, using what are known as knots and control points, rather than explicitly. Thus, referring to FIGS. 14A and 14B, a trim curve C of order kt in UV parameter space is defined by Npts control points in UV space (not shown in the figures) and a knot vector of values t(i) in T parameter space of dimension Npts+kt. The knot vector t(i) divides the trim curve into Npts−kt+1 spans, with knot value t(kt+i−1) determining the value of the T parameter at the beginning of the ith span and knot value t(kt+i) defining the value of the T parameter at the end of the ith span. The curve is evaluated along a given span by determining from the knots and control points the U and V values corresponding to a point having a given T value along the span. In particular, the ith span of the curve is evaluated from kt control points i through kt+i−1 and 2kt−2 knot values t(i+1) through t(2kt+i−2), preferably using the Cox-DeBoor procedure described in U.S. Pat. No. 5,317,682.

Figure 14B:
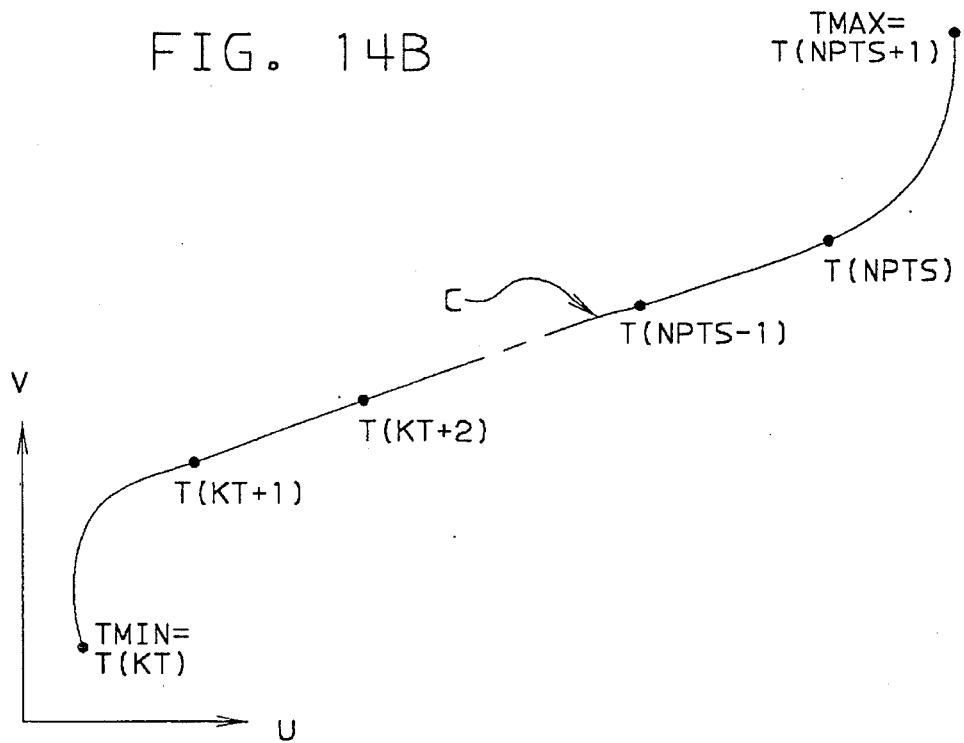
FIG. 14B is an illustration of the trim curve of FIG. 14A as it might appear in UV parameter space.

Thus the first span of the trimming curve C shown in FIG. 14B would be bound by parameter values T=t(kt) and T=t(kt+1), the second span bound by values T=t(kt+1) and T=t(kt+2) and so on, with the last span being bound by values T=t(Npts) and T=t(Npts+1). Points along the first span would be evaluated using control points 1 through kt and knot values t(2) through t(2kt−1), while points along the last span would be evaluated using control points Npts−kt+1 through Npts and knot values t(Npts−kt+2) through t(Npts+kt−1). It will be noted from the foregoing that knot values t(1) and t(Npts+kt), while defined for convenience, are not used at all in the evaluation procedure. Further, knot values t(2) through t(kt−1) and t(Npts+2) through t(Npts+kt−1) are not used to define trim curve spans, but are only used to evaluate the trim curves.

In a similar manner, a particular UV patch (to be defined) of a NURBS surface in XYZ space has the rational parametric form

*X=WX(U,V)/W(U,V)*

*Y=WY(U,V)/W(U,V)*

*Z=WZ(U,V)/W(U,V)* where WX(U,V), WY(U,V), WZ(U,V) and W(U,V) are polynomials in U and V of U order ku and V order kv. The U order ku is mu+1, where mu is the highest power of the U parameter in the parametric equations, while similarly the V order kv is mv+1, where mv is the highest power of the V parameter in the parametric equations. If W(T) is a constant (e.g. 1), then these equations reduce to the nonrational form:

*X=X(U,V)*

*Y=Y(U,V)*

*Z=Z(U,V)* where X(U,V), Y(U,V) and Z(U,V) are polynomials in U and V of U order ku and V order kv.

Figure 3A:
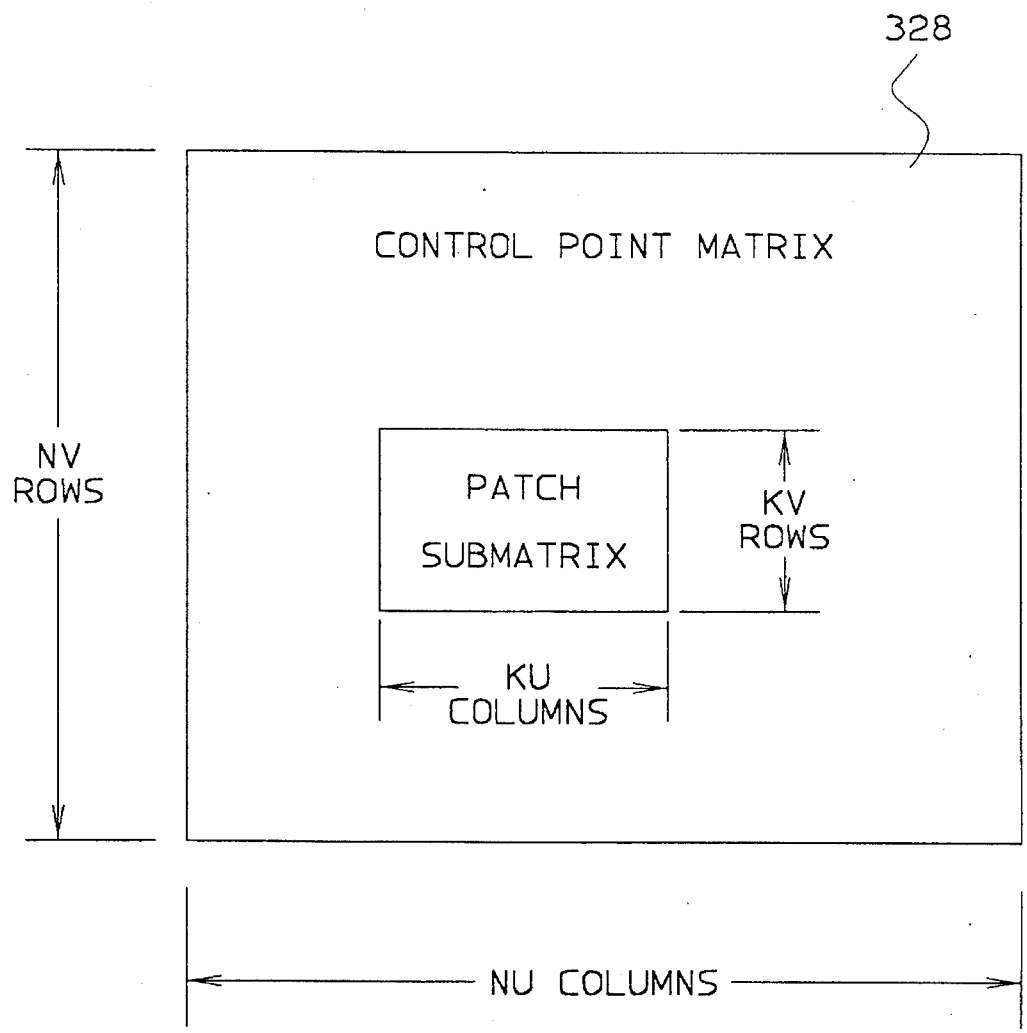
FIG. 3A illustrates the control point matrix used by the apparatus shown in FIG. 1 to evaluate NURBS surfaces.

In a manner similar to that for NURBS curves, these equations are defined implicitly, in terms of knots and control points, rather than explicitly. Thus, referring now to FIGS. 3A and 15, a NURBS surface of U order ku and V order kv is defined by a matrix of control points (FIG. 3A) in XYZ space having Nu rows and Nv columns, a U knot vector Uknot(i) of dimension Nu+ku, and a V knot vector Vknot(j) of dimension Nv+kv. The U knot vector Uknot(i) divides the UV region into Nu−k+1 U spans, with the knot value Uknot(ku+i−1) defining the beginning of the ith U span and the knot value Uknot(ku+i) defining the end of the ith U span. Likewise, the V knot vector Vknot(j) divides the UV region into Nv−kv+1 V spans, with the knot value Vknot(kv+j−1) defining the beginning of the jth V span and the knot value Vknot(kv+j) defining the end of the jth V span. The U spans and V spans defined in this manner intersect to form UV patches, each UV patch being the intersection of a U span and a V span. Thus, referring to FIG. 15, the bottom left UV patch of the UV region would be bound by upper and lower U parameter values U=Uknot(ku) and U=Uknot(ku+1) and V parameter values V=Vknot(kv) and V=Vknot(kv+1).

A UV point is evaluated by determining the XYZ coordinates (and optionally the X, Y and Z components of the normal vector) corresponding to the point. Points in the ijth patch formed by the intersection of the ith U span and jth V span are evaluated from a subportion of the control point matrix (FIG. 3A) consisting of ku rows i through ku+i−1 and kv columns j through kv+j−1, together with 2ku−2 U knot values Uknot(i+1) through Uknot(2ku+i−2) and 2kv−2 V knot values Vknot(j+1) through Vknot (2kv+j−2), preferably using Cox-DeBoor procedure described in U.S. Pat. No. 5,278,948. Thus, points within the bottom left UV patch of FIG. 15 would be evaluated using control points from the intersection of rows 1 through ku and columns 1 through kv of the control point matrix, using knot values Uknot(2) through Uknot(2ku−1) and Vknot (2) through Vknot (2kv−1). Other UV patches would be evaluated similarly, using knot values and matrix subportions suitable for the patch in question.

Figure 14C:
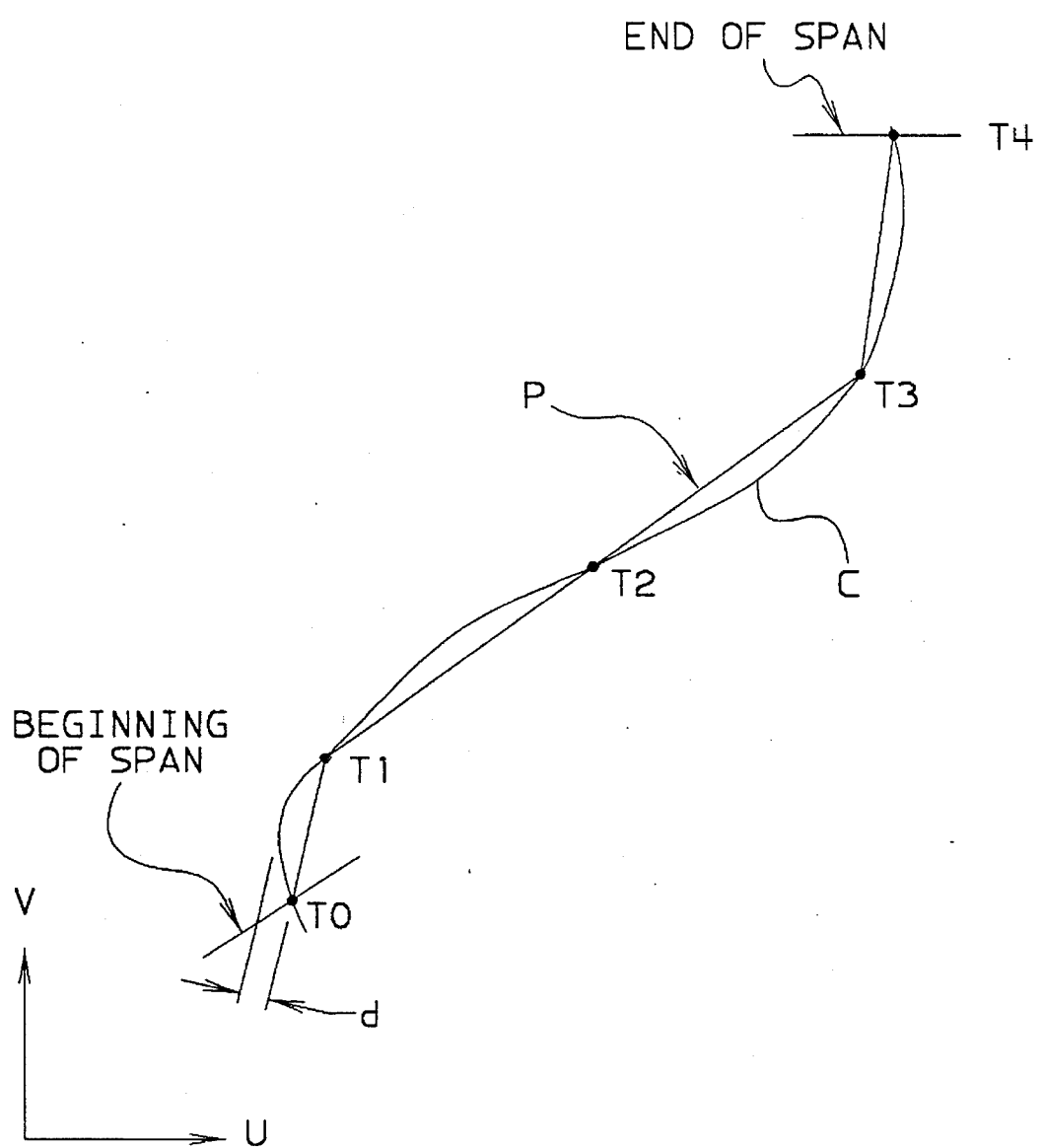
FIG. 14C is an illustration, in UV parameter space, of a polyline approximation to a trim curve span.

NURBS curves and surfaces are defined as continuous functions of the parameter values. Thus, a UV NURBS surface in XYZ space is a continuous mapping between UV parameter space and the XYZ target coordinate space, while, similarly, a trimmed NURBS curve in UV parameter space is a continuous mapping between the trim curve parameter T and the UV target coordinate space. To make these representations amenable to processing in a computer graphics system, these curves and surfaces are tessellated—that is, divided into a finite set of contiguous surface portions or line segments. Thus, referring to FIG. 14C, a continuous trim curve portion C beginning at T0 and ending at T4 is tessellated into a polyline P comprising a plurality of piecewise linear contiguous intervals or segments T0–T1, T1–T2, T2–T3 and T3–T4 which approximate the ideal continuous curve C.

Using this technique, a trim contour comprising one or more contiguous trim curves (each comprising one or more spans), may be approximated by a trim polygon. Multiple polygons may be used to define topologically complex trimming regions, in the manner described above. As is conventional, a polygon processor receiving data for overlapping polygons combines the polygons in an exclusive OR fashion, as shown in FIG. 14E for smooth curves.

Although the manner in which the smooth parametric curve C is converted to a polyline P is not as such a part of the present invention, a preferred method of achieving such tessellation is disclosed in U.S. Pat. No. 5,317,682. As disclosed in that application, a NURBS curve is tessellated into intervals on a span-by-span basis, with each span being divided into equal T intervals, the number of intervals being selected so as to keep the chordal deviation d (FIG. 14C) between the ideal curve C and the polyline P within predetermined bounds.

Figure 15:
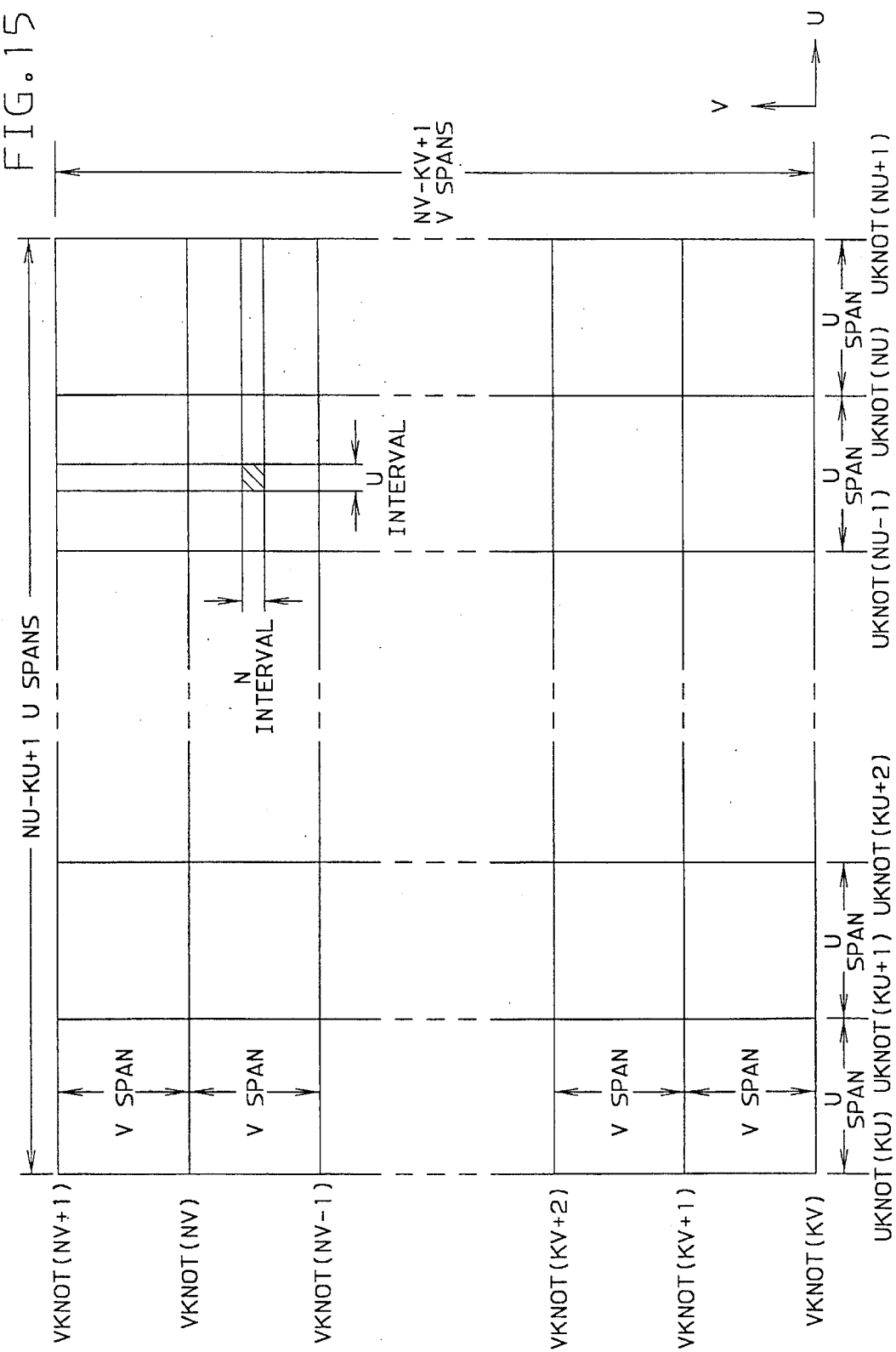
FIG. 15 is an illustration, in UV parameter space, of the relationship between the U and V spans and the U and V knot vectors defining the spans.
Figure 16:
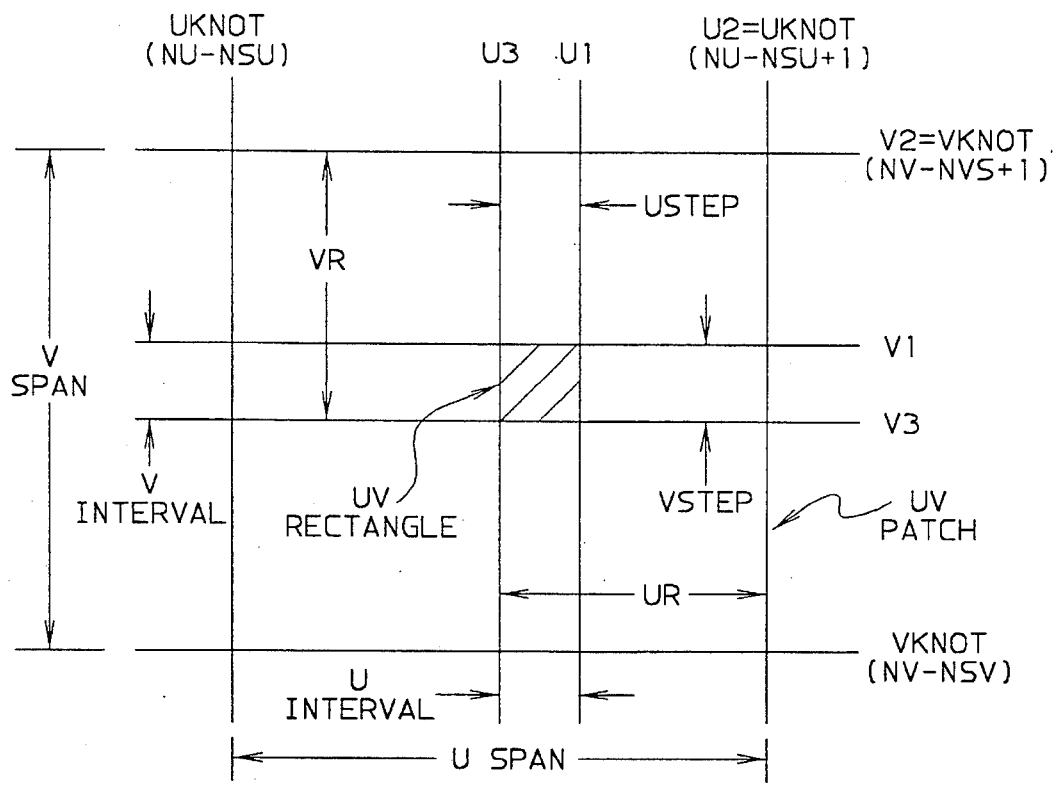
FIG. 16 is an illustration, in UV parameter space, of a UV patch and a UV rectangle within that patch.

In a similar manner, as shown in FIGS. 15 and 16, each U and V span is divided—or tessellated—into a plurality of equal U or V intervals, the interval size being selected again as to keep the chordal deviation between the ideal surface and the approximated surface within bounds. A suitable tessellation procedure for NURBS surfaces is described in U.S. Pat. No. 5,278,948.

Figure 14D:
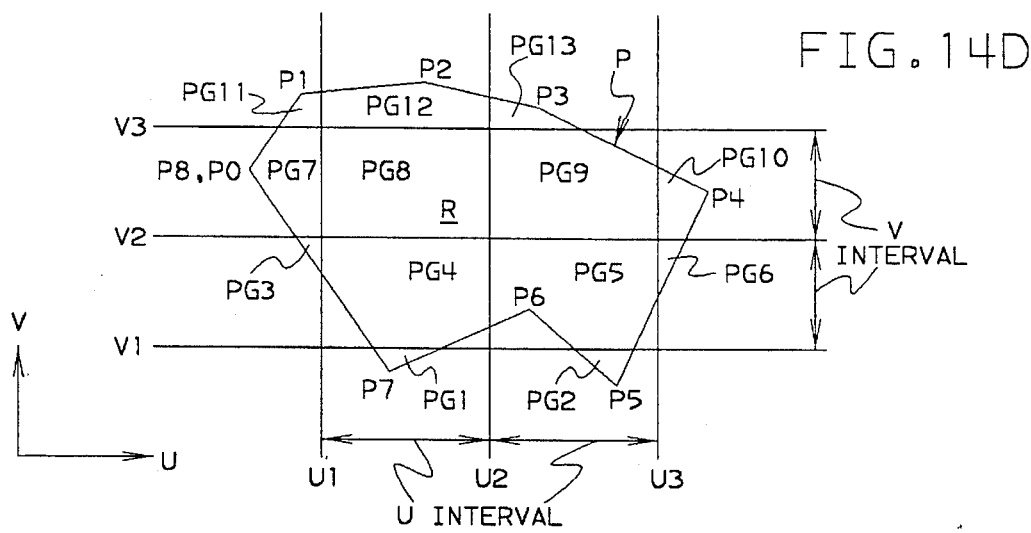
FIG. 14D shows the polygons formed by the intersection of the UV rectangles in parameter space with a trim curve polygon in that space.
Figure 14E:
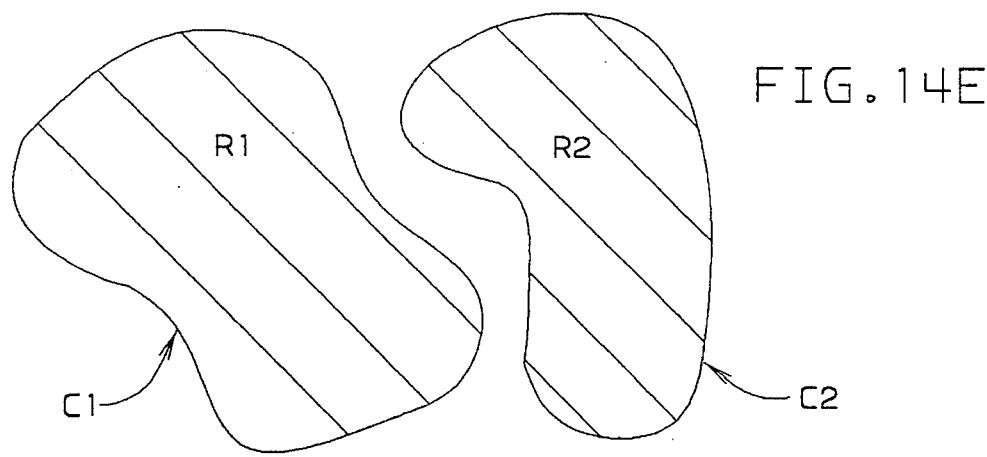
FIG. 14E illustrates the trimming region formed by two trimming contours with disjoint trimming regions.
Figure 14F:
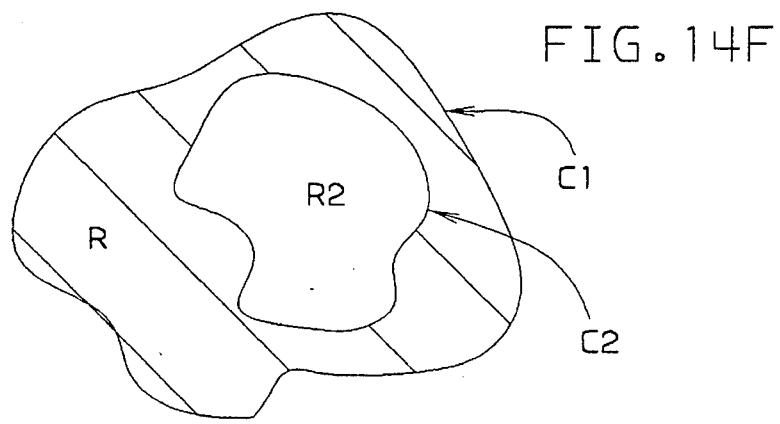
FIG. 14F illustrates the trimming region formed by two trimming contours, the first of which surrounds the second.

FIG. 14D shows how a trim curve contour comprising a closed polyline P with vertices P0–P8 (with P8=P0) (equivalently, a polygon with vertices P1–P8) defines a trimming region R in UV space. In terms of the UV rectangles defined by the U and V intervals into which the U and V spans have been tessellated, the trimming region R may be divided into polygons Pg1–Pg13, each of which consists of that portion of a UV rectangle within the trimming region R. In this particular instance, the trimming region consists of a single interior polygon Pg8 made up of an entire UV rectangle and peripheral polygons Pg1–Pg7 and Pg9–Pg13, each of which is made up of only a portion of a UV rectangle and may be concave (e.g. Pg5).

In accordance with the present invention, and as described in detail below, the trimmed NURBS surface portion represented by trimming region R is rendered by determining, for each of the polygons Pg1–Pg13 making up the trimming region R, the vertices of the polygon. (Except for the peripheral portions of the trimming region, these will typically be the corners of the UV rectangles.) Once the vertices of a polygon have been determined, and any necessary vertex data generated, vertex data for the polygon vertices is sent to a concave polygon processor to render the polygon. This data consists typically of the X, Y and Z coordinates of each vertex, together with the X, Y and Z components of the normal vector to the UV surface at the vertex. As is conventional, the X and Y values determine where the vertex is displayed on the screen, the Z value provides depth information, which may be used for clipping or for determining which of two elements overlies the other and should be displayed, and the normal vector components may be used to determine shading. If the vertex in question is also a vertex of the UV rectangle, then these values are evaluated using the Cox-DeBoor procedure referred to above or some comparable procedure. If, on the other hand, the vertex is along an edge or in the interior of a UV rectangle (e.g. P12–P14 in FIG. 14E), then the data for that vertex is calculated from the vertex data for the corners of the UV rectangle by either linear or bilinear interpolation, as described below.

2. Rendering Apparatus a. General

The principal components of the apparatus used to practice this invention are illustrated in FIG. 1. These components are:

a. Global memory 102
b. Graphics control processor (GCP) 104
c. Drawing and shading processors 106
d. Raster graphics display 108
e. System bus 110
f. Secondary bus 112

Global memory 102 consists of sufficient random access memory (RAM) to store the definitions of a number of graphics entities, as well as any additional information such as attributes (e.g. colors) and transformation matrices required to specify how and where these entities are to appear on a display screen. This information is produced by a general purpose host computer (not shown) using appropriate communications facilities (not shown).

Drawing and shading processors 106 contain the frame buffer(s) required to refresh the screen of raster graphics display 108. This component also includes logic for drawing straight lines between a pair of points on the screen and for filling polygonal areas bounded by straight lines between points on the screen. This component may optionally include a z-buffer to support hidden surface elimination, logic to interpolate the colors on the interior of a polygon between the colors of the vertices, and facilities to compute the colors at the vertices of a polygon based on standard lighting models. In order to support high-performance rendering, this component may contain a number of specialized microprocessors. The details of how these functions are provided are not part of this invention.

Graphics control processor 104 is capable of selecting an individual graphics entity, as stored in global memory 102, and converting it into a form which is supported by drawing and shading processors 106. In the case of a trimmed NURBS surface, graphics control processor 104 generates a set of polygons with vertices specified in screen coordinates, based on the data for a trimmed NURBS surface. The details of this process are provided below.

System bus 110 provides a high-speed data path between global memory 102, graphics control processor 104, and drawing and shading processors 106. The principal purpose of bus 110 in this invention is to provide for exchange of data between global memory 102 and the graphics control processor 104. Drawing and shading processors 106 may also be capable of communicating with global memory 102 and graphics control processor 104 through system bus 110, but this path is not used in the rendering of trimmed NURBS surfaces. Secondary bus 112 provides an alternate data path from the graphics control processor 104 to the drawing and shading processors 106. This allows graphics control processor 104 to send data to drawing and shading processors 106 without interfering with the communication between graphics control processor 104 and the global memory 102.

b. The Graphics Control Processor

The principal components of the graphics control processor 102 are illustrated in FIG. 2. These components consist of:

a. An arithmetic logic unit (ALU) 200,
b. Code memory 202 for the ALU,
c. Data memory 204 for the ALU,
d. A bus interface unit (BIU) 206,
e. A graphics pipeline 208.

ALU 200 consists of an integer processing unit (IPU), a floating point processing unit (FPU), and a sequencer. The sequencer enables ALU 200 to process sequences of instructions stored in code memory 202, including branches, conditional branches and subroutine calls. The IPU performs the basic integer operations (add, subtract, multiply, shift, extract, merge, deposit) on integer values contained within a set of integer registers. The FPU performs the basic floating point operations (add, subtract, multiply, etc.) on floating point values stored within a set of floating point registers.

Code memory 202 contains space for instructions within address space, and data memory (also called local memory) 204 provides random access storage. The operation of ALU 200 during the processing of a trimmed NURBS surface is described below.

BIU 206 handles all communications protocols required to transfer data between ALU 200 and system bus 102. This unit 206 also buffers incoming data coming from the system bus 102 to ALU 200.

Graphics pipeline 208 handles the transformation, culling, clipping, and mapping of vectors and polygons, as well as special functions to support the rendering of trimmed surfaces. The transformation, culling, clipping, and mapping functions are standard graphics functions and are not specific to this invention, and they will not be described here. The special functions in support of trimmed surfaces are described below.

c. The Graphics Pipeline

Figure 2A:
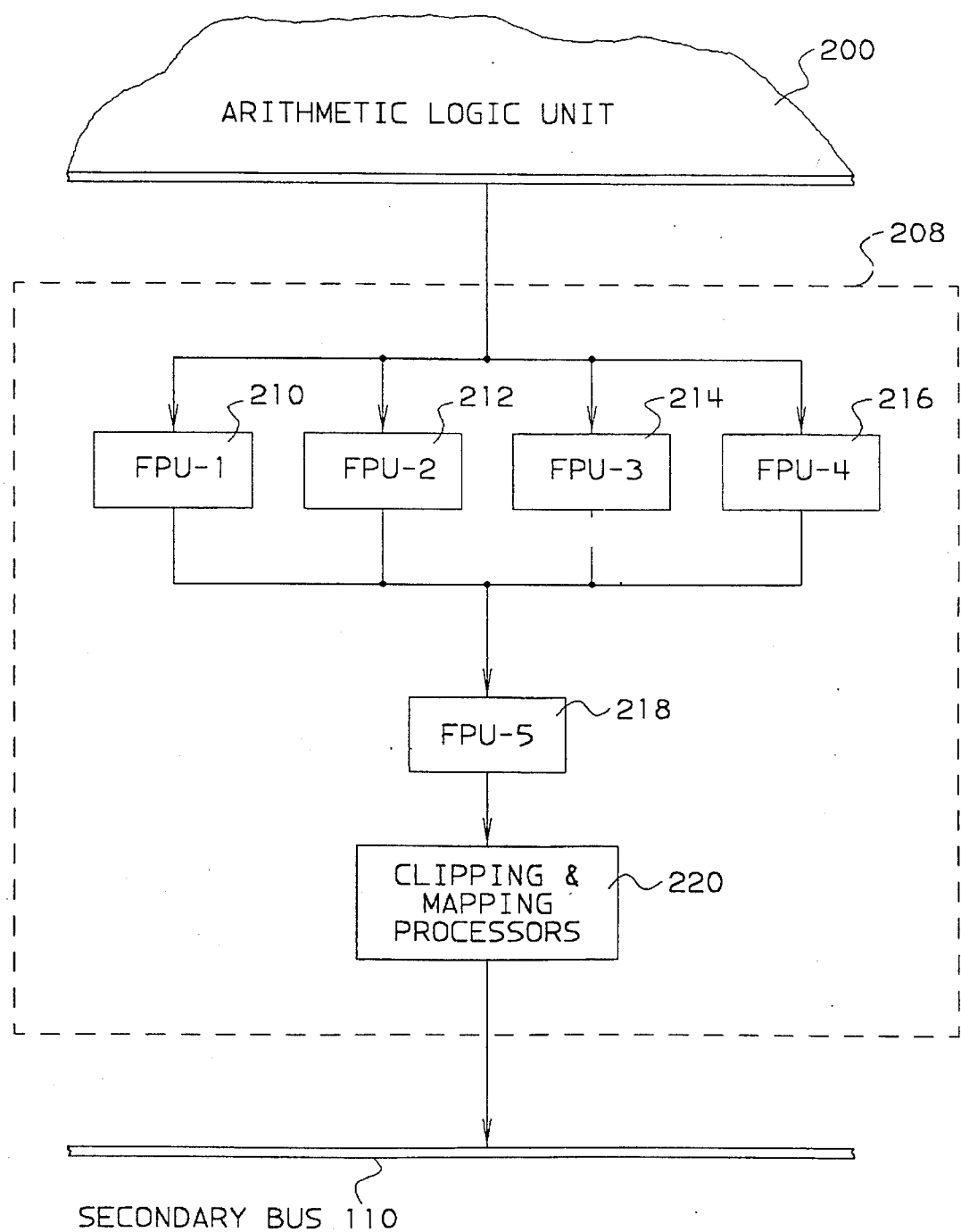
FIG. 2A is a schematic block diagram of the graphics pipeline of the graphics control processor shown in FIG. 2.

Referring to FIG. 2A, graphics pipeline 208 consists of a multiplicity of floating point processors which transform vertex coordinates and normal vectors, clip vectors and polygons to a 3D rectangular window, map the clipped coordinates to device coordinates, and send the resulting data to the drawing and shading processors 106 via the secondary bus 110. More particularly, graphics pipeline 208 includes a set of four parallel floating point processors (FPUs) 210–216 (FPU1–FPU4 in FIG. 2A) which can receive commands and data from the ALU 200, and transmit commands and data to a fifth floating point processor 218 (FPU5 in FIG. 2A). The fifth floating point processor 218 (FPU5) receives commands and data from the first four processors 210–216 and transmits commands and data to clipping and mapping processors 220.

Floating point processors 210–216 perform the basic floating point operations (add, subtract, multiply, etc.) on floating point values stored within a set of floating point registers. FPUs 210–218 are used for the evaluation and interpolation steps described below.

In addition to these functions, FPUs 210–216 may also be used to transform vertex coordinates and vertex normals of ordinary polygons (not necessarily associated with a trimmed surface), and FPU 218 may be used to eliminate or change the color of polygons based on the direction of the polygon normal vector. In the case of a polygon generated as part of a trimmed surface, the polygon normal vector may be approximated with the sum of the vertex normal vectors. In this way, the same set of hardware may be used both to transform ordinary polygons and to generate polygons representing a trimmed surface.

Clipping and mapping processors 220 receive commands and data from FPU 218 and send commands and data to the drawing and shading processors 106 by way of the secondary bus 112. Processors 220 recognize the above polygon commands and data defining the vertices of a polygon. The data for the vertex coordinates is compared to a 3D volume determined by the boundaries of a rectangular window within the screen of a graphics display and the near and far limits for a coordinate (Z) perpendicular to the screen. If none of the vertex coordinates of a polygon fall within this volume, then the polygon is rejected, and no data or commands are sent to the drawing and shading processors 106. If the coordinates of any vertex fall within this volume, then these coordinates are mapped into screen coordinates and the resulting mapped coordinates are sent to the drawing and shading processors 106 along with any additional data for vertex colors and vertex normal vectors. If a polygon is partially inside this volume, it will be replaced by the polygon representing its intersection with this volume. Vertex normal vectors may also be normalized to unity in preparation for lighting and shading calculations to be performed by the drawing and shading processors.

The functions of the clipping and mapping processors 220 may be provided by multiple microprocessors with appropriate connectivity. These functions are considered to be standard elementary graphics functions and they are not unique or specific to this invention. Consequently, the details of these functions will not be provided here.

The graphics pipeline 208 provides the following functions to support of the rendering of trimmed surfaces:

1. Start Convex Polygon.

This command is followed by a sequence of vertex data records. The data for each vertex includes the coordinates and normal vector for the vertex. This sequence is terminated by the End Polygon command.

2. Start Concave Polygon.

This command is followed by a sequence of vertex data records. The data for each vertex includes the coordinates and normal vector for the vertex. This sequence is followed by the End Polygon command or the Break Polygon command.

3. Break Polygon.

This command is followed by a sequence of vertex data records. The data for each vertex includes the coordinates and normal vector for the vertex. This sequence is followed by the End Polygon command or the Break Polygon command. This command may be used to separate successive subareas to be treated as a single polygon, and implies a connection between the preceding vertex and the first vertex following the most recent Start Concave Polygon or Break Polygon command.

4. End Polygon.

This command indicates the end of a polygon. It follows the last vertex, has no data, and implies a connection between the last vertex and the first vertex following the most recent Start Convex Polygon, Start Concave Polygon, or Break Polygon command.

Additional commands to load transformation matrices, colors, clipping boundaries, and the like may be provided to prepare the graphics pipeline for the rendering of a trimmed surface. Since these commands are not relevant to the present invention, they will not be described here.

d. Specification of a trimmed NURBS surface

The data required to specify a trimmed surface are summarized in FIG. 3. This data structure has been constructed so as to permit the specification of a trimmed NURBS surface as defined by the proposed PHIGS+ standard. This data structure may be divided into four principal sections:

1. Scalar variables (300–310)
2. Vector variables (320–326)
3. Trimming contours (312–318)
4. Control point matrix (328)

The first section (scalar variables) includes the following entries:

1. Header (300). This consists of an "opcode" which indicates that the following data specifies a trimmed NURBS surface.

2. Status flags (302). This includes a status bit to indicate whether the control points for the NURBS surface represented in the following data are provided in rational form (x, y, z, w) or non-rational form (x, y, z). Additional bits are used to indicate whether the tessellation parameters for the NURBS surface are undefined, workstation defined, or application defined.

3. U order (304). This is the polynomial order of the U parameter for the NURBS surface represented in the following data. This value is represented herein by the symbol ku.

4. U number (306). This is the number of columns in the control point matrix provided in the following data. This value is represented herein by the symbol Nu.

5. V order (308). This is the polynomial order of the V parameter for the NURBS surface represented in the following data. This value is represented herein by the symbol kv.

6. V number (310). This is the number of rows in the control point matrix provided in the following data. This value is represented herein by the symbol Nv.

Figure 4:
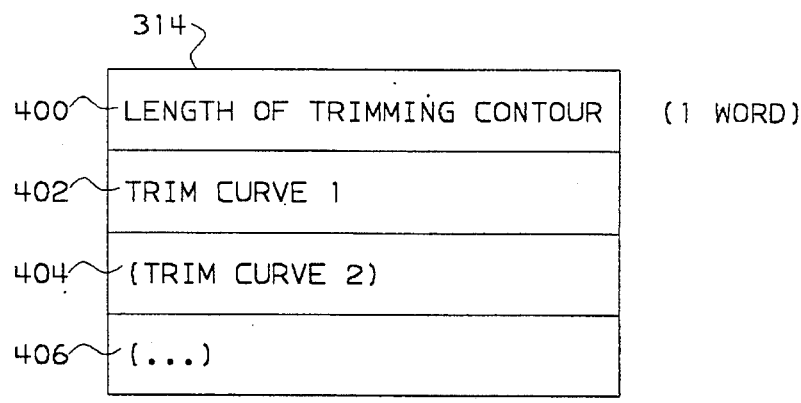
FIG. 4 illustrates the format used to store data specifying a trimming contour in the portion of global memory shown in FIG. 3.

The data specifying the trimming contours consists of one word (312) which indicates the total length (number of bytes) of the data for the trimming contours, followed by the data for one or more trimming contours (314–318). A trimming contour may also be referred to as a trimming loop. The data for each trimming contour or loop (e.g. 314) is summarized in FIG. 4. This data consists of one word (400) indicating the number of bytes contained in the data representing the contour, followed by the data (402–406) for one or more trimming curves or segments.

Figure 5:
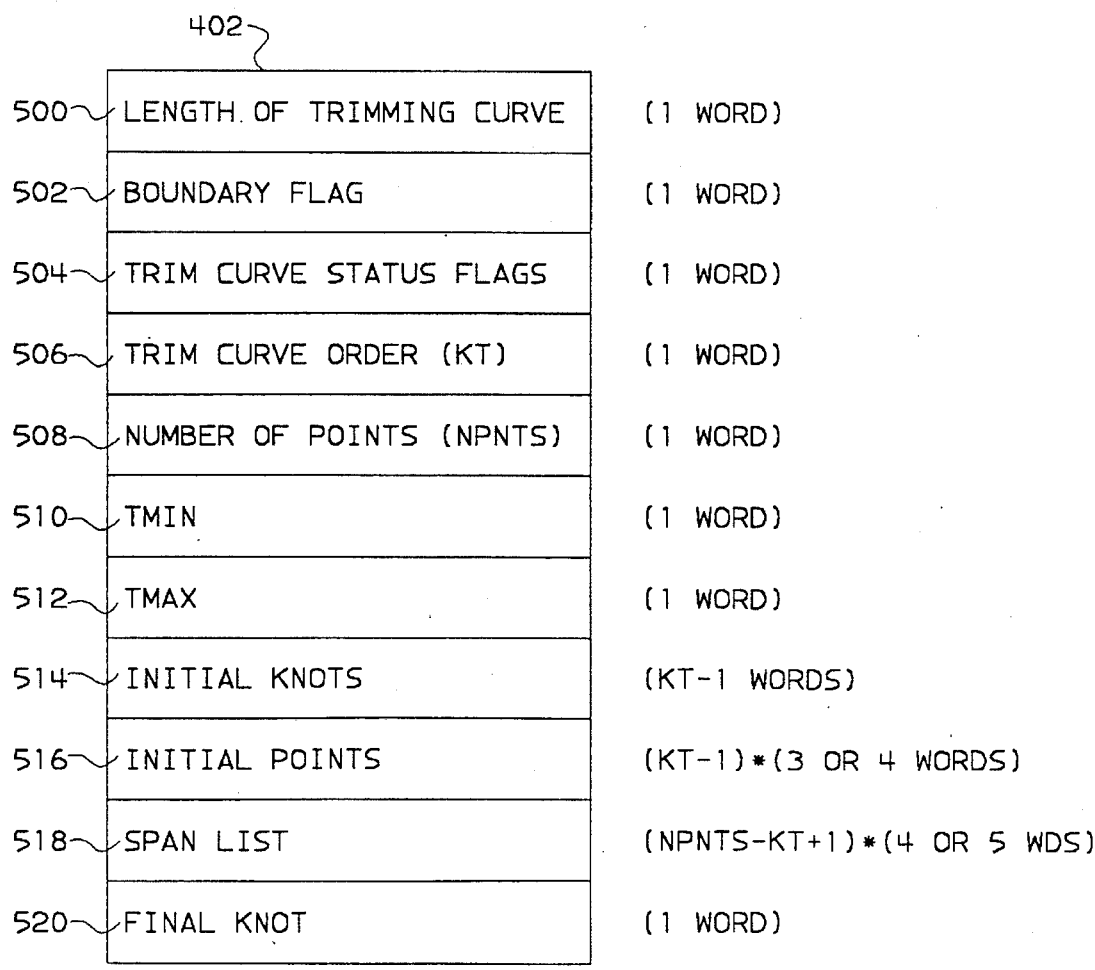
FIG. 5 illustrates the format used to store data specifying a trimming curve in the portion of global memory shown in FIG. 4.

The data for each trimming curve or segment (e.g. 402) is summarized in FIG. 5. This consists of the following elements:

1. Length of trimming curve (500). This indicates the number of bytes contained in the data which specifies this trimming curve.

2. Boundary flag (502). This indicates whether this trimming curve is to be treated as a boundary for the purposes of assigning attributes such as edge color and edge line style.

3. Trim curve status flags (504). This word includes a bit indicating whether the data for this trim curve is in rational form (u, v, w), or non-rational form (u, v). This word also includes bits to indicate whether the tessellation data for this trim curve is undefined, workstation-defined, or application-defined.

4. Trim curve order kt (506). This indicates the polynomial order of the trim curve defined by this data.

5. Number of points Npnts (508). This specifies the number of control points contained in the data for this trim curve.

6. The values tmin (510) and tmax (512). These values indicate the initial and final values of the parametric coordinate t to be used for this trimming curve.

7. Initial knots (514). This consists of kt−1 words which specify the first kt−1 knot values in the knot vector for this trimming curve.

8. Initial points (516). This consists of kt−1 data records each composed of 3 or 4 words which specify control points i=1 to kt−1. If the control points are in the non-rational form, as indicated by the trim curve status flags, then each record contains 3 words, including a knot value, t(i+kt−1), and a control point (ui, vi). If the control points are in the rational form, then each record contains 4 words, including a knot value, t(i+kt−1), and a rational control point (ui, vi, wi).

9. Span list (518). This consists of (Npnts−kt+1) data records each composed of 4 or 5 words which specify control points i=kt to Npnts. If the control points are in the non-rational form, as indicated by the trim curve status flags, then each record contains 4 words, including a knot value, t(i+kt−1), a control point, (ui, vi), and a tessellation parameter, d(i−kt+1). If the control points are in the rational form, then each record contains 5 words, including a knot value, t(i+kt−1), a rational control point, (ui, vi, wi), and a tessellation parameter, d(i−kt+1).

10. Final knot (520). This specifies the last knot in the trimming curve, t(Npnts+kt).

The knot vectors for each trimming curve consist of a non-decreasing sequence of parameter values.

The data for the trimming contours in global memory 102 (FIG. 3) is followed by the four sets of vector data. These consist of the U knot vector (320), the U tessellation vector (322), the V knot vector (324), and the V tessellation vector (326). The U and V knot vectors each consist of a non-decreasing sequence of parameter values.

The fourth section of data consists of the control point matrix (328). This consists of Nv data records, each composed of Nu control points. Each control point consists of 3 or 4 words depending on the rational/non-rational bit in the status flags word.

e. Allocation of local memory for the ALU

Figure 6:
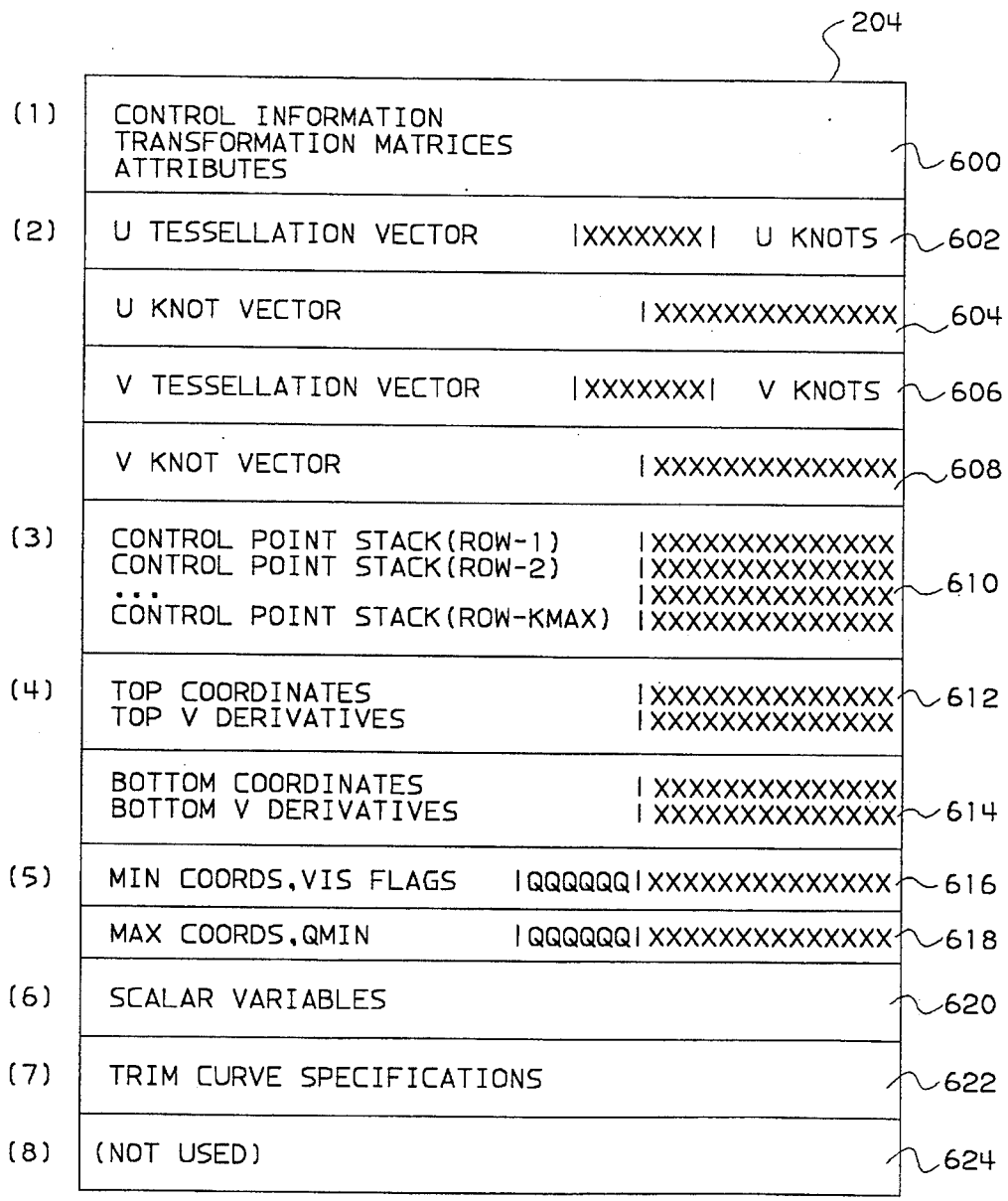
FIG. 6 illustrates the allocation of local memory shown in FIG. 2.

As indicated above, the graphics control processor 104 has access to local memory 204 ("data memory" in FIG. 2). This memory 204 is partitioned into 8 sections as shown in FIG. 6. These sections consist of:

1. Control information (600)
2. U and V parameter vectors (602–608)
3. Surface control point stack (610)
4. V interval stack (612–614)
5. UV patch characteristics (616–618)
6. Scalar variables (620)
7. Trim curve specifications (622)
8. Unused space (624)

The first section (600) includes the transformation matrices, attributes, and other data required to control and support the processing of multiple windows, graphics structures, and structure elements. This processing may include, but is not limited to display list traversal. This processing is not specific to this invention and will not be described in this document.

Sections 2 through 5 (602–618) are composed of kmax+7 blocks of 4*Nmax words, where kmax is the maximum polynomial order for the V parameter, and Nmax is the maximum number of rows or columns permitted for the control point matrix for the NURBS surface. With limits of kmax=4 and Nmax=64, these sections require a total of 2816 words.

Section 2 (602–608) occupies one block and contains four vectors:

1. The U tessellation vector, with Nu−ku+1 values (words) (602).
2. The U knot vector, with Nu+ku values (604).
3. The V tessellation vector, with Nv−kv+1 values (606).
4. The V knot vector, with Nv+kv values (608).

The first element of the U knot vector is located Nmax−ku words beyond the beginning of the U tessellation vector. The first element of the V tessellation vector is located 2*Nmax words beyond the beginning of the U tessellation vector. The starting address of the V knot vector is located Nmax−kv words beyond the beginning of the V tessellation vector.

Section 3, the control point stack (610), stores kmax blocks of data. If, as is typical, kmax=4, this section contains 4 blocks of data. Each block contains one row of the control point matrix, with the control point values stored in the order (x1, y1, z1, w1, x2, y2, . . . w(Nu)). The last 4*(Nmax−Nu) words of each block are not used.

Section 4, the V interval stack (612–614), also shown in FIG. 6A, contains four blocks of data. The first block contains Nu sets of coordinates (Xi(V), Yi(V), Zi(V), Wi(V)) determined by the corresponding columns of the control point stack, the appropriate portion of the V knot vector, and the current value of the V parameter, while the second block contains the derivatives of the elements of the first block with respect to the V parameter (612). The third block contains the values located in the first block for the previous value of V, while the fourth block contains the values located in the second block for the previous value of V (614).

Section 5 (616–618) contains values characteristic of each patch within the row of patches determined by the contents of the control point stack. The first block in this section (616) contains the values of Xmin, Ymin, and Zmin for each of the Nu−ku+1 patches in this row, and a visibility flag (Vis) for each patch. The second block (618) contains Xmax, Ymax, and Zmax for each patch, as well as the normal vector threshold (Qmin) for each visible patch.

Section 6 (620) contains the values of the following scalar quantities:

1. Trim curve status values
2. T parameter denominators
3. V parameter status
4. V denominators
5. V span status
6. V interval status
7. U parameter status
8. U denominators
9. U span state parameters
10. U interval status
11. Coordinates, derivatives, and normal vectors for the top of the current V interval
12. Coordinates, derivatives, and normal vectors for the bottom of the current V interval Section 7 (620) contains the data which specifies the locations of the trimming curves in the UV parameter space. Initially, this section contains the definitions of the trimming curves as NURBS curves. These curves are evaluated and the results (MOVDRW, U(t), V(t)) are stored in a work area in global memory 102. For each V interval, the trim curve data is copied from global memory 102 to graphics control processor 104 in a block transfer operation. The (U,V) coordinates in this data are clipped to the current V interval and the resulting clipped coordinates are stored in local memory 204, overwriting the NURBS representations in this section.

The NURBS representation of each trimming curve consists of a header record and a sequence of control point records. The header record consists of 6 words and contains the values of the following quantities:

1. NSTART=Address of start of data for next curve in this loop,
2. NFLAG=status bits for this curve,
3. KTRIM=polynomial order for this curve,
4. NPNTS=number of control points for this curve,
5. TMIN=initial parameter value for this curve,
6. TMAX=final parameter value for this curve.

The second word in the header (NFLAG) includes the following bits:

TCCAL: Tessellation vectors being computed (0=no, 1=yes),

TCRAT: 0=non-rational, 1=rational,

TCWRK: Tessellation vector defined by workstation (0=no, 1=yes),

TCAPP: Tessellation vector defined by application (0=no, 1=yes),

TCEDG: 0=this curve not an edge, 1=this curve is an edge.

A record with NSTART=0 follows the last trimming contour (loop).

The number of control point records for each curve is given by NPNTS. Each control point record contains 15 words. The Ith control point record contains the following values (for I=1 to Npnts):

1. Initial knots and tessellation parameters:
   a. Knot values, t(I) (for I=1 to KTRIM−1), and
   b. Tessellation parameter Dt(Ispan) for span Ispan=I−KTRIM+1 (for I=KTRIM to NPNTS),
2. Other knot values, t(I+KTRIM−1),
3. U for control point I,
4. V for control point I,
5. W for control point I, Upon evaluation of the parameter T, the trim curves are represented by the disjoint UV polylines defined by a sequence of data records of the form (MOVDRW, U(T), V(T)). The values of U(T) and V(T) indicate a point on the surface in the UV parameter space. The MOVDRW values contain the following flags:

EDGON=0: do not apply edge attributes to following edge,
EDGON=1: apply edge attributes to following edge,
NSDIR=horizontal flag (0=horizontal, 1=not horizontal),
NSDR2=north/south direction flags (0=south, 1=north),
EWDIR=vertical flags (0=vertical, 1=not vertical),
EWDR2=east/west direction flags (0=west, 1=east),
MDLOOP=0 (move) for first point in a contour, =1 (draw) for all other points,
MDCLOS=1 for last point in a closure.

The following bits in the MOVDRW words are set to zero and reserved for use during surface evaluation:
EFAKE=1 if preceding edge generated by clipping
MDVTOP=1 if V=Vtop (V1)
MDVBOT=1 if V=Vbot (V3)
MDULFT=1 if U=Ulft (U1)
MDURGT=1 if U=Urgt (U3)

As the trim curves are evaluated, the convexity of the resulting UV polygon may be tested using conventional means. The results of the convexity tests may be represented by a flag CONVEX which is initialized to 1 (true) prior to evaluation of the trimming curves. If there is more than one trimming contour, or if any vertex fails the convexity test, this flag is set to 0 (false) and subsequent convexity testing may be skipped. Alternatively, the convexity tests may be eliminated and all contours may be treated as concave (as for CONVEX=false).

3. Processing of Trimmed NURBS Surfaces a. General

Figure 8:
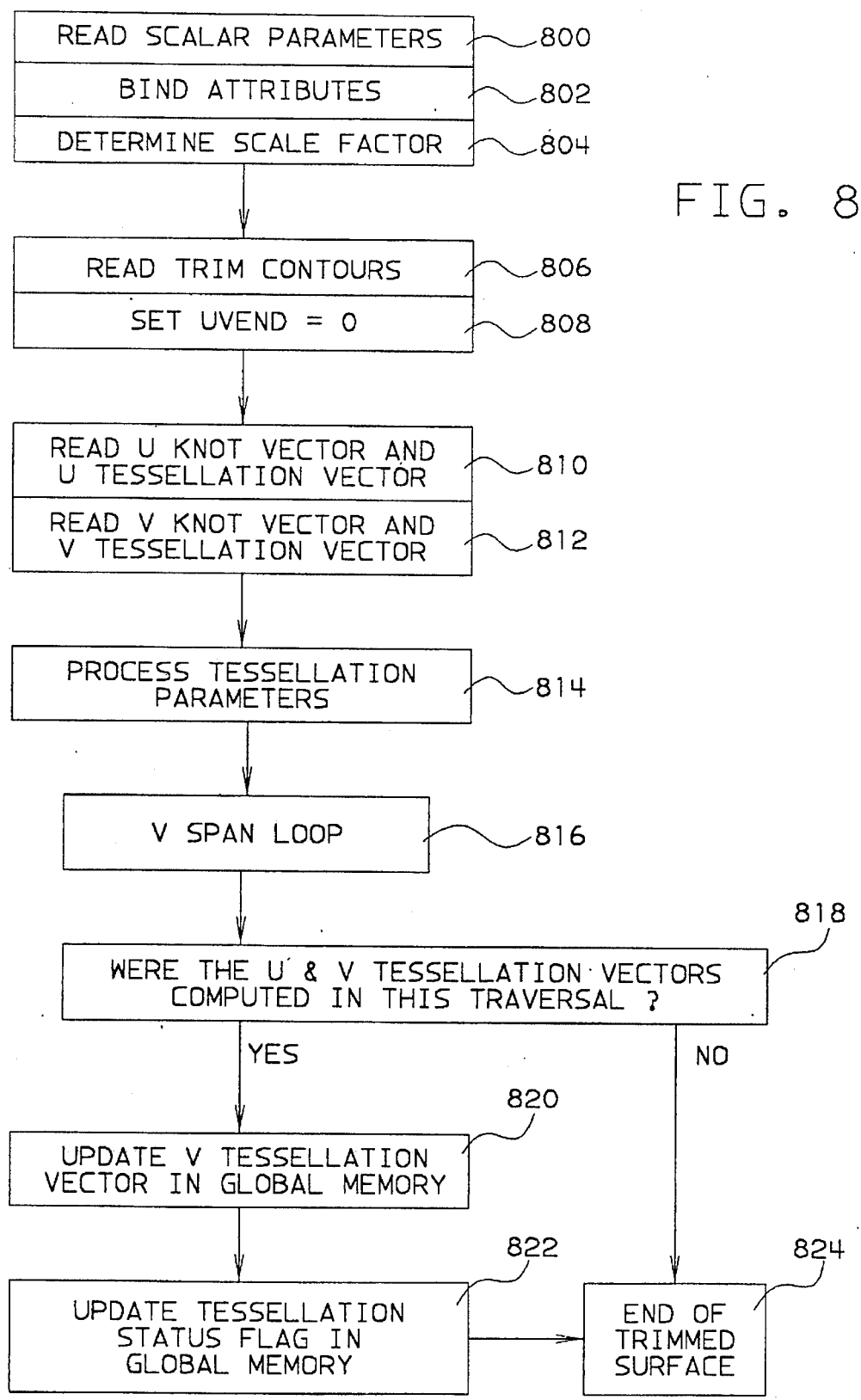
FIG. 8 is a flow chart of the general procedure for rendering a trimmed NURBS surface used in the present invention.

The apparatus described in the preceding sections may be used to render a trimmed NURBS surface by means of the procedure outlined in FIG. 8. This procedure has three principal stages: the initiation stage, the rendering stage, and the termination stage.

The initiation stage consists of the following steps:

1. Read the scalar parameters for the definition of a surface (800) from global memory 102. These are the first six values (words) 300–310 in the data structure shown in FIG. 3. These values are then stored in local memory 204.

2. Bind attributes (802). This consists of performing appropriate operations to ensure that characteristics such as the interior color, edge line style, and so forth have the required values.

3. Determine the scale factor (804). This factor represents the ratio of modelling coordinates to device coordinates and is determined by the transformation matrix and window-to-viewport ratios. These values are obtained from section 600 of the data structure shown in FIG. 6.

4. Read trim contours (806). This consists of transferring the trim curve data from global memory 102 to local memory 204. The value of UVend is set to zero to indicate that the trim curves have not been evaluated (808).

5. Read the vector data. This consists of reading the U knot and tessellation vectors (810) and the V knot and tessellation vectors (812). The U and V knot vectors are simply copied from the input data stream (from global memory 102) into the sections 604 and 608 of local memory 204 indicated in FIG. 6. If the tessellation vectors are undefined, the corresponding locations 602 and 606 in local memory 204 (see FIG. 6) are cleared in preparation for the calculation of these quantities. Otherwise, the scale factor and surface approximation control values are applied to these quantities in preparation for the rendering stage. The surface approximation criterion and control values are available in section 600 of local memory 204. The details of this step are not critical to the operation of this invention and are not provided here.

6. Process tessellation parameters (814). This step consists of computing the tessellation vectors for the U and T parameters when they are not provided in the input data stream. If the U tessellation vector is not provided in the data, then then these values are computed using the same procedures used for untrimmed NURBS surfaces. The details of this procedure may be found in U.S. Pat. No. 5,278,948. If the tessellation vector(s) are not available for one or more trimming curves, then these values are computed using a procedure such as that disclosed in U.S. Pat. No. 5,317,682.

Figure 9A:
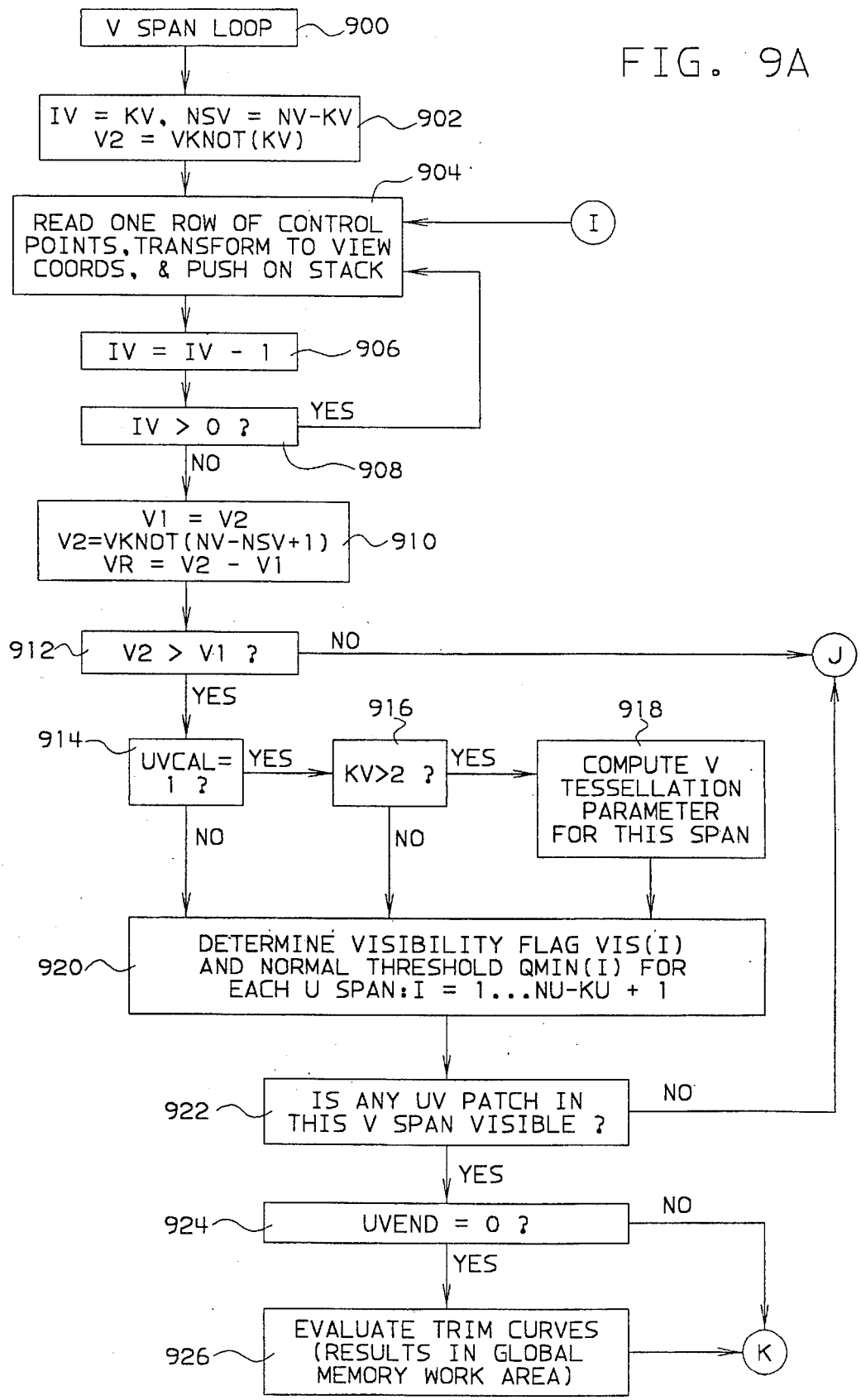
FIGS. 9A–9B, is a flow chart illustrating the V span loop of the procedure shown in FIG. 8.
Figure 9B:
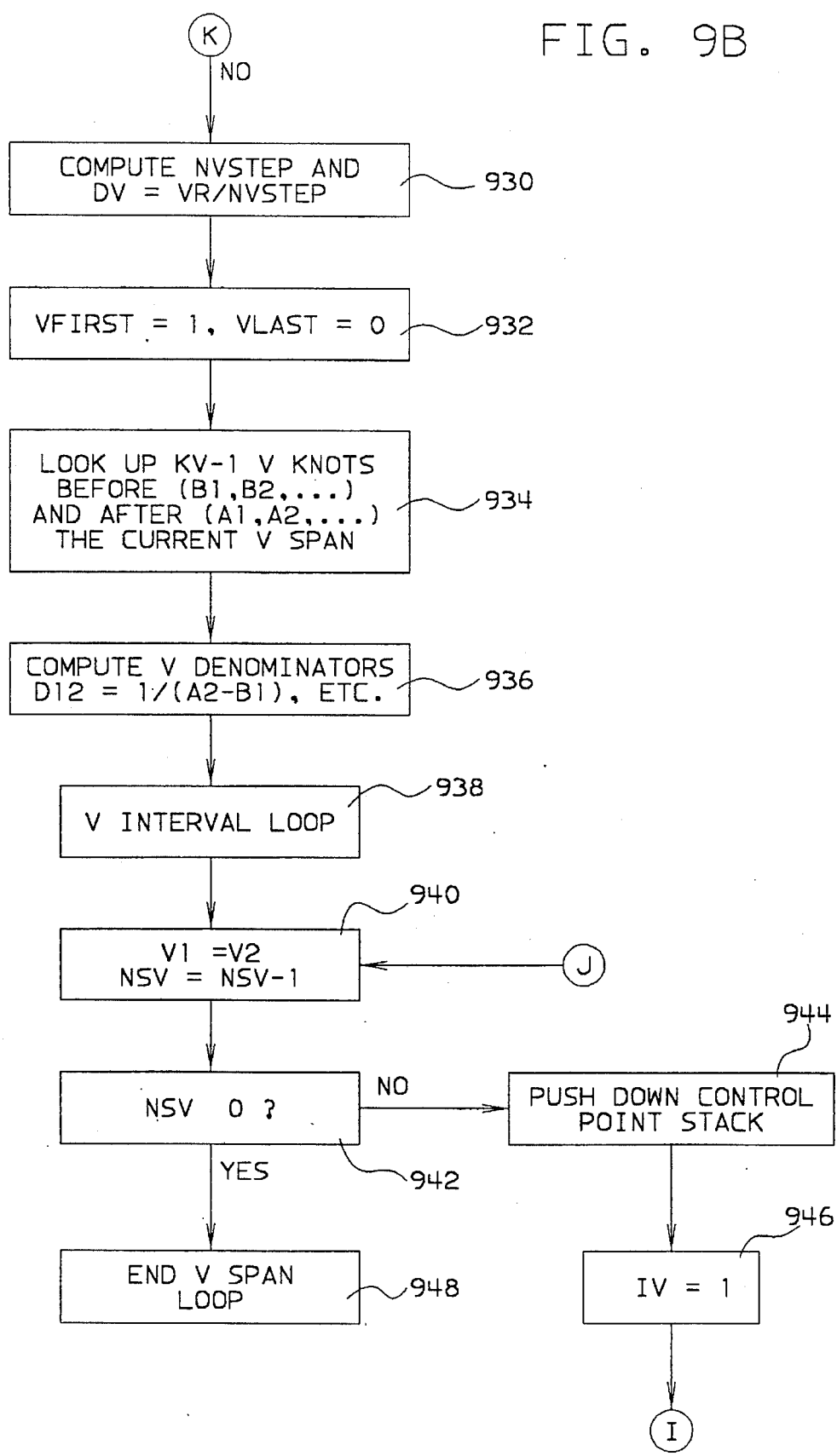

Following the initiation stage, the procedure enters the rendering stage (816) in which the trim surface is divided into a sequence of V spans and the portion of the surface contained within each V span is processed as shown in FIG. 9, described below.

Following the rendering stage, the procedure enters the termination stage (818–824). If the U and V tessellation vectors were computed in this traversal (818), the V tessellation vector (820) and tessellation status flag (822) are updated in global memory 102 before terminating the procedure (824). If the U and V tessellation vectors were not computed in this traversal, the procedure terminates without updating any tessellation vectors or status flags.

b. V Span Loop

Referring now to FIG. 9, the V span loop (900–948), constitutes the principal loop of the rendering stage. The V span loop begins by setting a variable Iv, indicating the number of empty rows in the control point stack 610 in local memory 204, equal to the V order kv; setting a variable Nsv, indicating the number of unprocessed V spans, equal to Nv–kv, where Nv is the V dimension of the control point matrix 328 in global memory 102; and setting V2, which indicates the upper limit of the span being processed, equal to Vknot (kv) (902). The V span loop then enters a subloop (904–908) in which it successively reads rows of control points from the control point matrix 328, transforms them to view coordinates, and pushes them onto the control point stack 610 until all of the rows of the stack have been filled. Thereafter, the V span loop sets a variable V1, indicating the lower limit of the span being processed, equal to V2; resets the upper span limit V2 to Vknot (Nv–Nsv+1); and sets Vr, indicating the range of the span being processed, equal to V2–V1 (910).

The V span loop then determines whether V2 is greater than V1, as it would be for a proper V span (912). If it is not a proper span, then the loop jumps to step 940, skipping the intervening steps. Otherwise, if the V tessellation parameter has not been provided in the input data stream, as indicated by a UVcal flag equal to 1 (914), and if the V order kv is 2 or greater (916), the V tessellation parameters for the span defined by the limits V1 and V2 are computed (918). This procedure, as well as the procedure of step 904, is the same as the corresponding procedure used for untrimmed NURBS surfaces, described in U.S. Pat. No. 5,278,948.

Thereafter, the V span loop determines the visibility of each UV patch contained within the current V span (920). This is the result of a trivial rejection test based upon the convex hull of each patch. If a patch passes this test, the visibility flag for the span is set, the visibility flag Vis(i) for the patch is set, and the normal vector threshold Qmin(i) is computed and stored in local memory 204. The procedures used to perform these operations are the same as the corresponding procedures used for an untrimmed NURBS surface, as described in U.S. Pat. No. 5,278,948.

If no UV patch in the current V span is visible, then the loop jumps to step 940, skipping the intervening steps. If, on the other hand, any UV patch is visible (922), then the loop proceeds along the portion consisting of steps 924–926. On this portion of the V span loop, the UVend flag is first checked to see whether it is set at zero, indicating that trim curves have not been evaluated (924). If they have not been evaluated, then the trimming curves are evaluated at this point and the results are stored in global memory 102 (926). The process of evaluating the trimming curves maybe based on the Cox-DeBoor algorithm as described in U.S. Pat. No. 5,317,682.

The V parameter interval Dv is then computed (930) by first determining the number Nvstep of V intervals in which the current V span is to be divided and then dividing the range Vr of the current V span by that number. Thereafter, in preparation for processing of the individual V intervals within the current V span, a flag Vfrst, indicating that the first V interval is being processed, is set to 1, while a flag Vlast, indicating that the last V interval within the current V span is being processed, is set to zero (932). The program then looks up the kv−1 Vknots before (B1,B2, . . . ) and after (A1,A2, . . . ) the current V span (934), and computes a set of V denominators Dij=1/(Aj−Bi) (936). These quantities Dij are the interpolation denominators required by the Cox-DeBoor algorithm. These denominators are stored in local memory 204. The program then proceeds to the V interval loop (938) shown in FIG. 10, to be described below.

After completing the V interval loop 938 for the current V span, the lower limit V1 of the next V span is set equal to the current upper limit V2 and the number of spans Nsv to be processed is decremented by 1 (940). If the quantity Nsv has been decremented to less than zero (942), the program ends the V span loop (948). Otherwise, the program proceeds to process the next V span by pushing down another row of control points onto the control point stack 610 (944). This is accomplished by setting the variable Iv, indicating the number of empty stack rows, equal to 1 (946) and returning to step 904 to read the next row of control points, transform them to view coordinates and push them onto the control point stack 610. At this point, the V span loop processes the next span in a manner similar to that of the first.

c. V. Interval Loop

Figure 10:
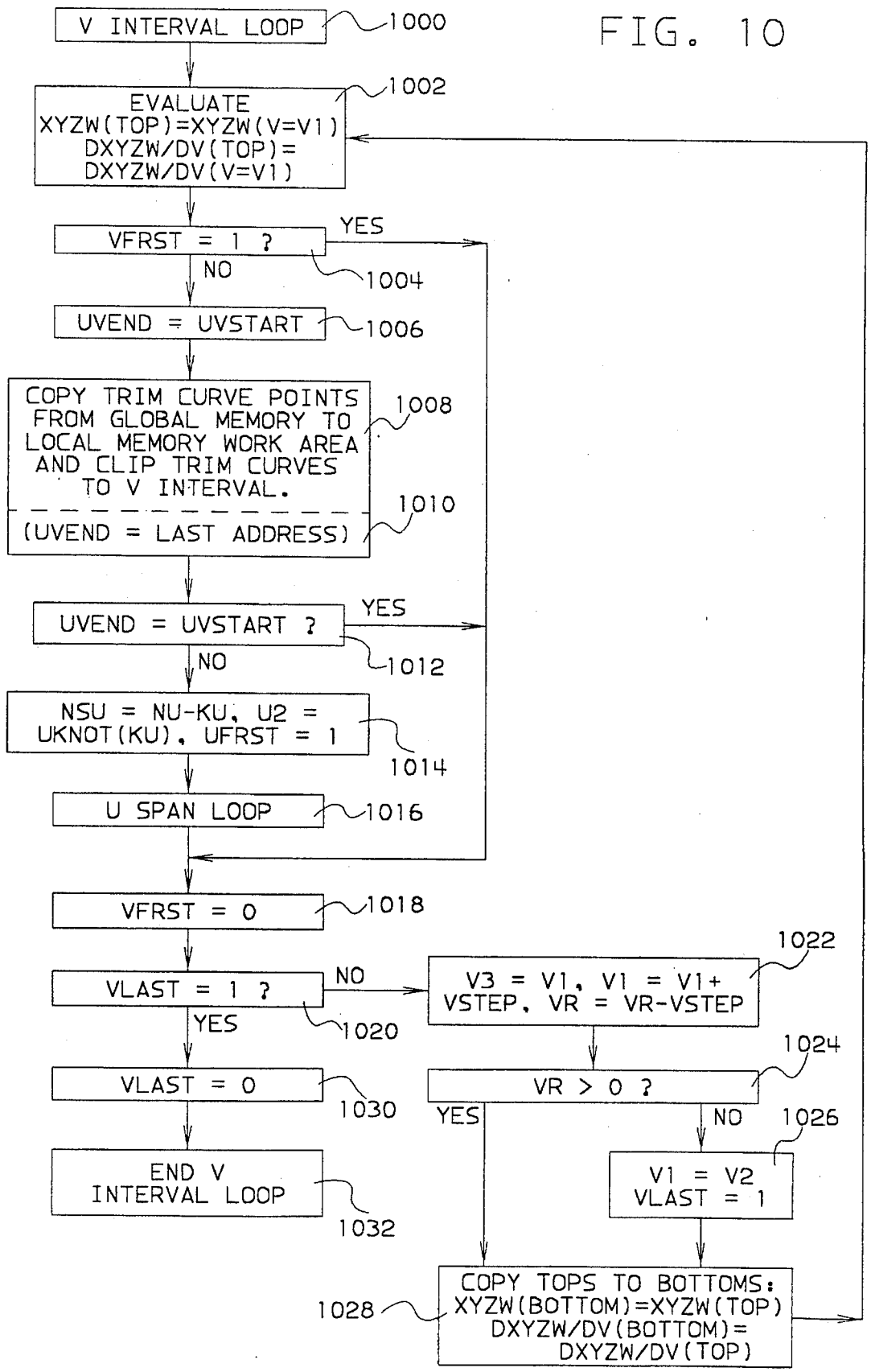
FIG. 10 is a flow chart of the V interval loop of the V span loop shown in FIG. 9.

The V interval loop, which is traversed for each V span to process each of the V intervals making up that span, is shown in FIG. 10.

The V interval loop starts with the evaluation of the V dependence of the surface coordinates (WX, WY, WZ, and W) and the derivatives of these quantities with respect to V for V=V1 (1002). The may be accomplished using the Cox-DeBoor algorithm, as described in U.S. Pat. Nos. 5,317,682 and 5,278,948. This algorithm has the special advantage of yielding the derivatives as a free byproduct of the coordinate evaluation. The results of these calculations are stored in the "top" portion 612 of the V interval stack (FIG. 6A) located in section 4 of local memory 204 FIG. 6.

If the flag Vfrst is set equal to 1 (1004), indicating that this is the first V interval in the current V span, the flag Vfrst is reset to 0 (1018). The flag Vlast is then tested to determine whether this is the last V interval of the current V span (1020). If so, the flag Vlast is reset to 0 (1030) and this pass of the V interval loop is terminated (1032). If this is not the last V interval of the span, the variables V1 and V3 are incremented to indicate the respective upper and lower limits of the current V interval, and the variable Vr indicating the remaining range of the current V span is decremented by Vstep (1022). If the remaining range Vr has been decremented to less than 0 (1024), the interval upper limit V1 is set equal to the span upper limit V2 and the flag Vlast, indicating the last interval of the current V span, set equal to 1 (1026). The information stored in the top portion 612 of the V interval stack is then copied to the bottom portion 614 of the stack, since the information corresponding to the top of the previous interval now corresponds to the bottom of the current interval (1028). The procedure then returns to step 1002 to evaluate new quantities for the top portion 612 of the V interval stack.

Figure 7:
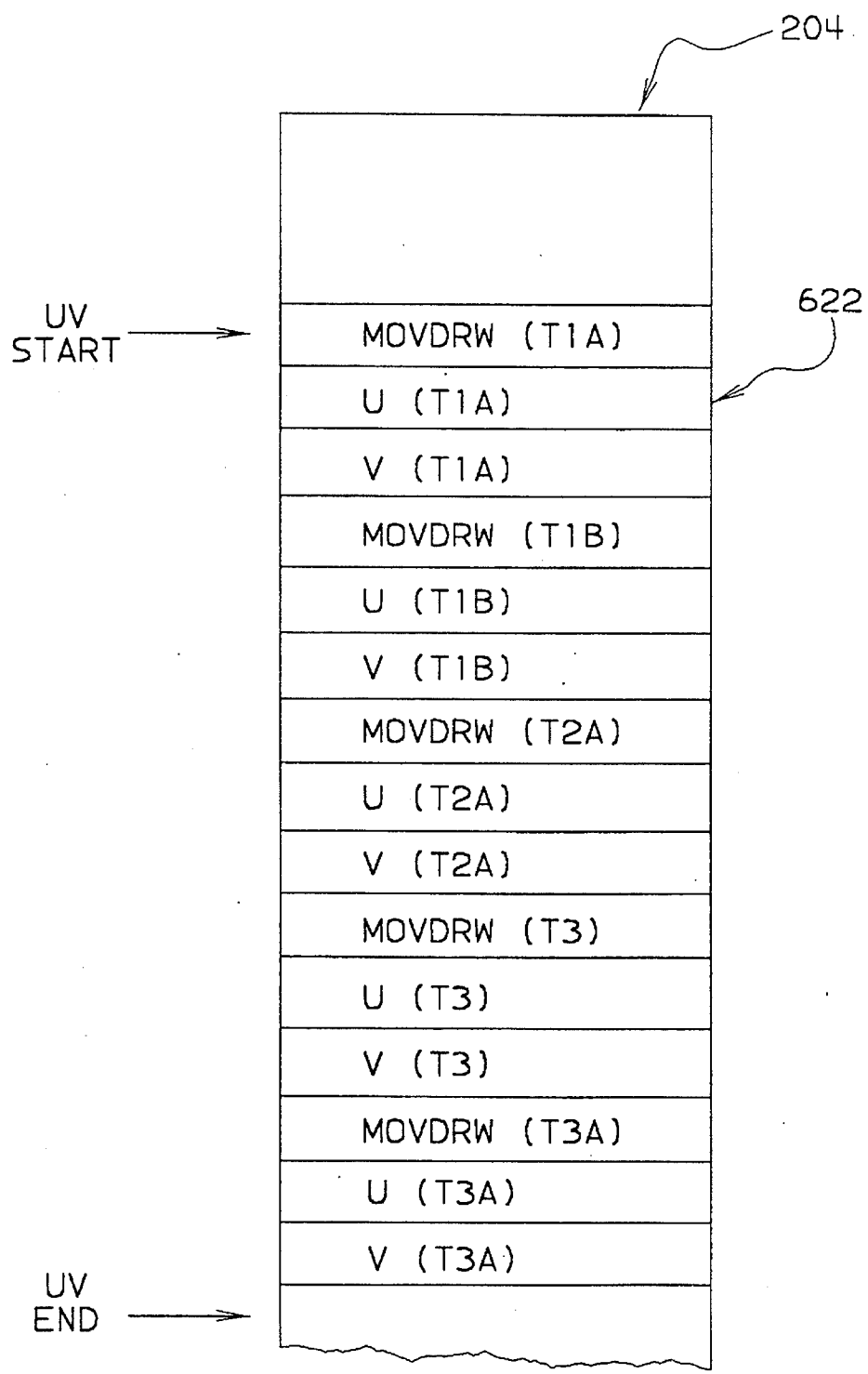
FIG. 7 illustrates the format used to store data specifying an evaluated trim curve in local memory.

If Vfrst is other than 1, indicating that this is not the first pass through the V interval loop (1004), then the variable UVend is initialized to point to the start of section 622 of local memory 204 (UVstart), as shown in FIG. 7, and the trim curve data in global memory 102 is copied to the graphics control processor 104 in a block transfer. The first point (always a "move") is copied into section 622 without changing UVend.

As each additional trim curve vertex is received by the graphics control processor 104, the resulting vector is classified as a "move" or a "draw" based on the V coordinate and the MDLOOP bit of the MOVDRW word which accompanies the UV coordinates of each vertex. If the MDLOOP bit is zero (move), the vertex is classified as a move. Otherwise (MDLOOP bit is one, draw), the vector is clipped to the current V interval. Vertices within the V interval (or on the lower boundary) are classified as "draw" points and vertices falling outside the V interval (or on the upper boundary) are classified as "move" points. If the vector crosses the upper (V1) or lower (V3) boundaries of the current V interval, then new vertices are created by interpolation, and the new vertices are classified as "draw" points. If a new vertex is created where a vector crosses the upper (lower) boundary then bit MDVTOP (MDVBOT) of the MOVDRW word is set to 1. If the vertex is created by a vector entering the current V interval, then bit EFAKE of MOVDRW is set to 1.

Figure 11:
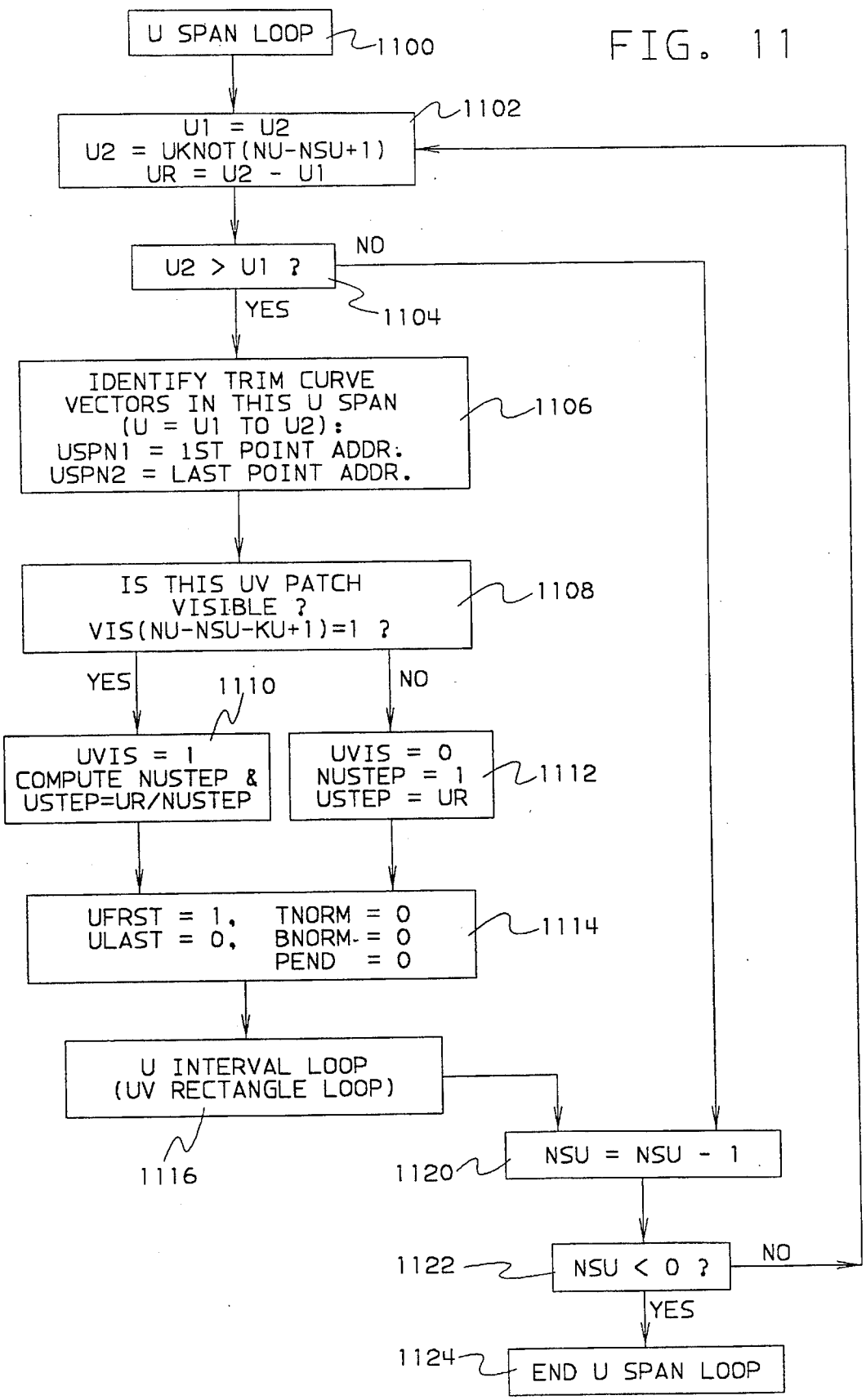
FIG. 11 is a flow chart of the U span loop of the V interval loop shown in FIG. 10.

The values of MOVDRW, U, and V are stored in section 622 local memory 204 at UVend (FIG. 7), and UVend is advanced by three words. If no vertices are found in this V interval, the value of UVend will remain unchanged at UVstart, and processing continues with the next V interval (1012). Otherwise (UVend>UVstart), the procedure enters the U span loop (1016), details of which are shown in FIG. 11.

Figure 17:
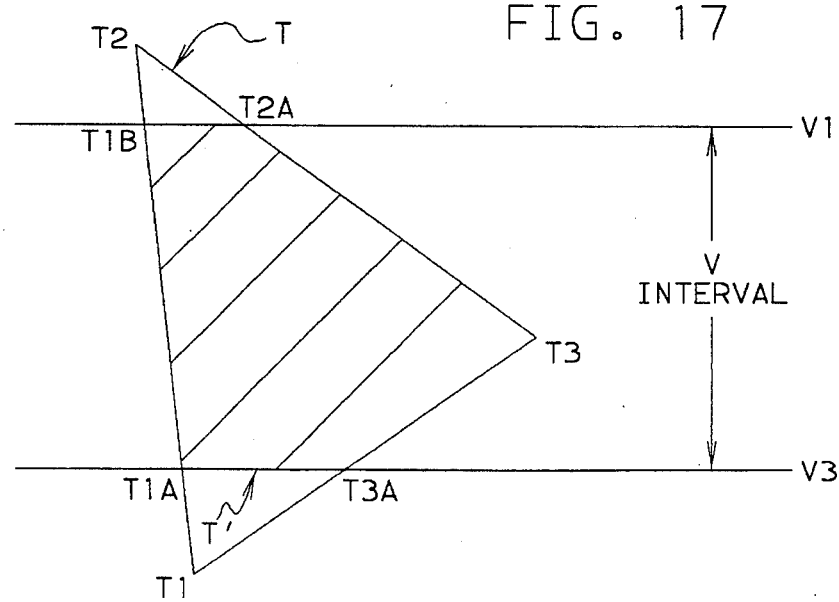
FIG. 17 is an illustration, in UV parameter space, of a trim polygon, clipped to the current V interval.

An example of this is shown in FIGS. 7 and 17. FIG. 17 shows a V interval having an upper limit V1 and a lower limit V3, through which passes a trim curve polygon T having vertices T1, T2 and T3. Vertex T1 lies below the V interval V3–V1, vertex T3 lies within the current V interval and vertex T2 lies above the current V interval. This trim curve polygon is clipped to the V interval V3–V1 by forming new vertices T1*a* and T3*a* from the intersection of the segments T1–T2 and T3–T1 and the line V=V3 and forming new vertices T1*b* and T2*a* from the intersection of the segments T1–T2 and T2–T3 and the line V=V1. The trim curve polygon T', clipped to the current V interval V3–V1, consists of the vertices T1*a*, T1*b*, T2*a*, T3 and T5. The vertex information for this clipped trim curve polygon is stored as 15 words in section 622 of local memory 204, as shown in FIG. 7. The 15 words consist of five groups of three words corresponding to the respective vertices T1*a*, T1*b*, T2*a*, T3 and T5 of the trim curve polygon T' clipped to the V interval V3–V1. Vertices T1*a*, T1*b*, T2*a*, T3 and T5 are all classified as "draw" points, as indicated by an MDLOOP bit of 1 in the MOVDRW word for each of these vertices.

If the convexity flag (CONVEX) is not set to 1 (true), then the resulting set of V-clipped UV coordinates may be tested for convexity. The results of these convexity tests may be represented by a flag VCONVEX which is initialized to 1 (true) prior to the transfer of the trim curve data from global memory 102 to local memory 204. If the V-clipped vertices are found to include more than one contour, or if any vertex fails the convexity test, then VCONVEX is set to 0 (false). If CONVEX is true or VCONVEX is false, subsequent convexity tests may be skipped. Alternatively, the flag VCONVEX may be set equal to the flag CONVEX and no convexity tests performed.

Preparatory to entering the U span loop of step 1016, the V interval loop initializes a quantity Nsu, indicating the number of U spans to be processed, at Nu−ku, where Nu represents the U dimension of the control point matrix 310 and ku indicates the k order (1014). Also at this time, a quantity U2, indicating the upper limit of the U span being processed, is initialized at Uknot (ku), and the flag Ufrst, indicating the first U interval of the current U span, is set equal to 1.

As noted above, on each pass through steps 1002–1028 of the V interval loop, the values stored in the top portion 612 of the V interval stack in local memory 204 are copied into the bottom portion 614, effectively pushing down the V interval stack in preparation for the next interval. This continues until V1 reaches V2, the last value of V in this V span, at which point processing returns to the V span loop (FIG. 9).

d. U Span Loop

The U span loop, which processes successive U spans defined by sequential pairs of U knots (U1, U2), where U2 is greater than U1, is shown in FIG. 11. Upon entering this loop (1100), and on each successive iteration, the span lower limit U1 is set equal to the previous upper limit U2, the new span upper limit U2 is set equal to Uknot (Nu−Nsu+1), and Ur, indicating the remaining portion of the current U span awaiting processing, is set equal to U2−U1 (1102). The span upper limit U2 is then compared with the span lower limit U1 (1104) to determine whether a proper U span has been defined. If not, processing jumps to step 1120, skipping intervening steps, in preparation for another iteration for the next U span. Otherwise, the set of trim curve segments currently stored in section 622 of local memory 204 is examined to identify the segments which also intersect the U span bounded by U1 and U2 (1106). The index of the first point of the first UV vector intersecting the current Uspan is stored as Uspn1 and the index of the end (2nd) point of the last UV vector intersecting the current Uspan is stored as Uspn2.

If the UV patch which contains the current U span is visible, as indicated by the visibility flag Vis(Nu−Nsu−ku+1) set as part of the V span loop (1108), then the flag Uvis is set equal to 1 and the U interval step size Ustep is computed based on the U tessellation vector and the surface approximation attributes (1110). Otherwise, the flag Uvis is set equal to 0, and a default step size Ustep equal to the range Ur of the current U span (equals U2−U1) is selected (1112). In either event, after a plurality of flags are set (1114), including a Ufrst flag indicating the first U interval of the current U span and a Ulast flag indicating the last U interval of the current U span, the U interval loop of FIG. 12 is entered (1116).

Figure 12A:
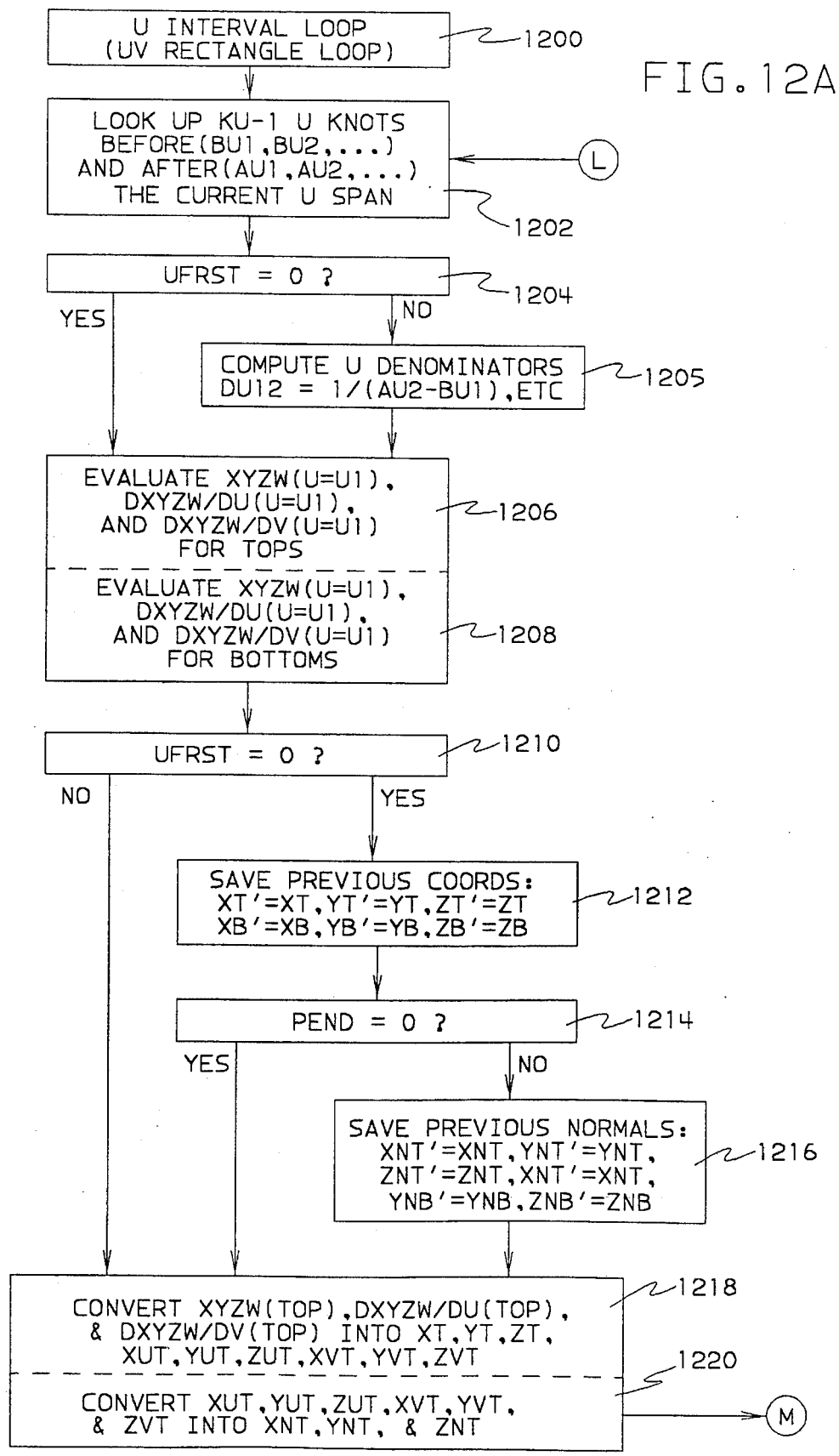
FIGS. 12A–12C, is a flow chart of the U interval loop of the U span loop shown in FIG. 11.
Figure 12B:
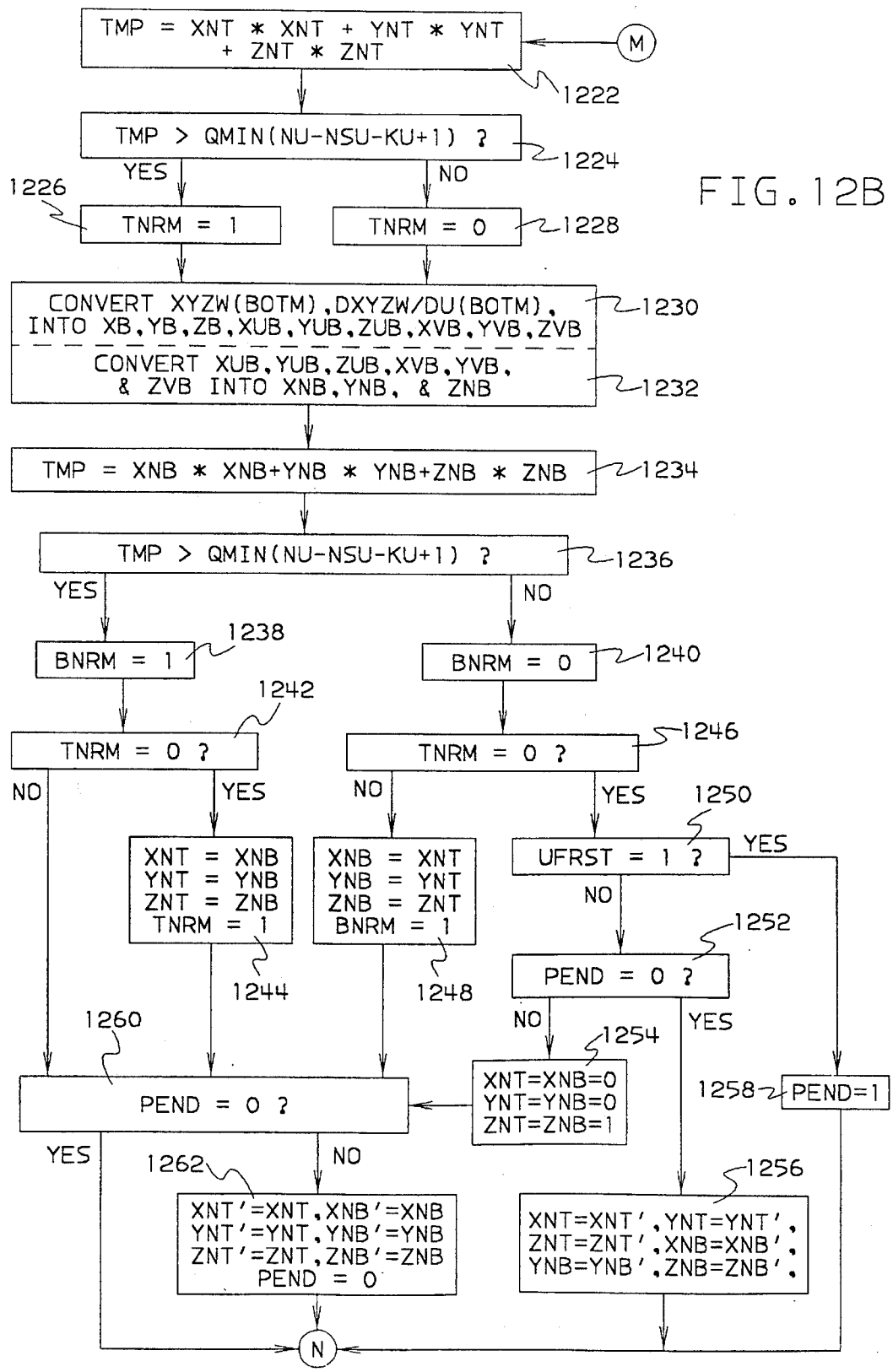
Figure 12C:
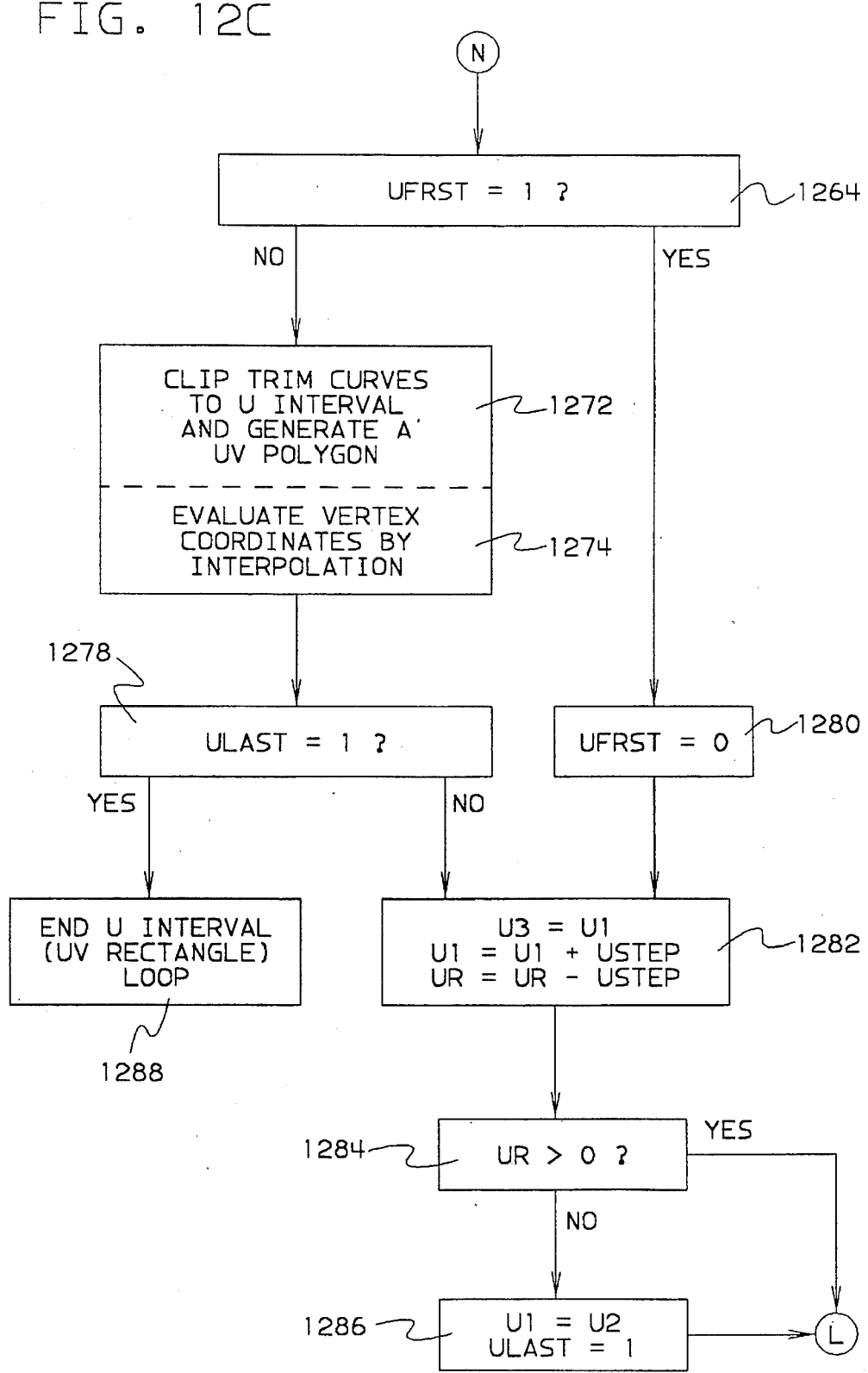

Upon returning from the U interval loop of FIG. 12, the index Nsu is decremented (1120) and compared with 0 (1122) to determine whether all of the U spans have been processed. If so, the U span loop is terminated (1124). Otherwise, processing returns to step 1102 for another iteration of the portion of the U span loop comprising steps 1102 through 1122.

e. U Interval Loop

The U interval loop starts with the evaluation of the U dependence of the surface based on the V interval stack (section 4 in FIG. 6) and the current value of U1. This process generates the values of the homogeneous coordinates WX, WY, WX, and W for U=U1 and the V parameter corresponding to the top and bottom of the current V interval (V=V3 and V=V1). In addition, the derivatives of these values with respect to U and V are also computed at this point. These values are then used to determine the corresponding Cartesian coordinates (X, Y, and Z, top and bottom) and their derivatives (tangent vectors) with respect to both U and V. Surface normal vectors for the top and bottom of the current V interval are determined from the vector (cross) product of the tangent vectors. The magnitudes of these normal vectors are compared to the normal vector threshold (Qmin) for the current UV surface patch. If the magnitude of a normal vector is less than this threshold value, the normal vector is replaced with a normal vector from an adjacent vertex. The procedure for replacing normal vectors is equivalent to that described in U.S. Pat. No. 5,278,948.

Upon entering the U interval loop (1200), the ku−1 U knots before and after the current U span are looked up (1202). If this is the first pass through the U interval loop for the current U span, as indicated by the Ufrst flag (1204), the U denominators Du12=1/(Au2−Bu1), etc. used for the Cox-DeBoor procedure are computed (1205). Upon completion of this computation, or if this is not the first pass through the U interval loop for the span, the homogeneous WX, WY, WZ and W coordinates, as well as their derivatives with respect to the U and V parameters, are evaluated at the upper limit U1 of the current U interval at both the top (V=V1) and bottom (V=V3) corners (1206, 1208).

If this is not the first pass through the U interval loop for the current U span, as indicated by the flag Ufrst (1210), the previously calculated top and bottom X, Y and Z coordinates are saved (1212) and the flag Pend checked to see whether it is set at 0 (1214). If it is not, then the X, Y and Z components of the top and bottom normal vectors are also saved (1216). The X, Y and Z coordinates and X, Y and Z components of the normal vector to the UV surface are then computed for the top right (U=U1, V=V1) corner of the current UV rectangle (1218), and the normal vector calculated as the cross product of the U and V tangent vectors at that point (1220).

The dot product of the top normal vector with itself is then calculated (1222) and compared with the Qmin for that span (1224). If the dot product exceeds Qmin, the flag Tnrm is set to 1 (1226); otherwise it is set to 0 (1228). The homogeneous coordinates WX, WY, WZ and W and corresponding U and V derivatives for the bottom right corner (U=U1, V=V3) of the current UV rectangle are then converted to X, Y and Z coordinates and their corresponding U and V derivatives (1230). The normal vector to the UV surface at that point is then computed as the cross product of the U and V tangent vectors corresponding to the U and V derivatives (1232). The dot product of the bottom normal vector with itself is then computed (1234) and compared with Qmin for the current U span (1236). If the dot product is greater than Qmin, the flag Bnrm is set to 1 (1238); otherwise it is set to 0 (1240). If Bnrm is 1 and Tnrm is 0 (1242), the top normal vector is set equal to the bottom normal vector and the flag Tnrm set to 1 (1244). If on the other hand Bnrm is 0 and Tnrm is 1 (1246), the bottom normal vector is set equal to the top normal vector and the flag Bnrm set equal to 1 (1248). If both Bnrm and Tnrm are 0, and if it is the first pass through the U interval loop for the current U span (1250), the flag Pend is set equal to 1 (1258); otherwise the flag Pend is checked to determine whether it is set at 0 (1252). If it is not, the previously saved X Y and Z coordinates and normal vector components are used for the top right and bottom right corners of the current UV rectangle (1256). Otherwise, a unit vector pointing along the Z axis is selected for both the top right and bottom right normal vectors (1254). Upon completion of this step, as well as upon completion of step 1242, 1244 or 1248, the flag Pend is checked to determine whether it is set at 0 (1260). If so, the top and bottom normal vectors are saved for possible later use and the flag Pend set to 0 (1262).

The above steps for calculating the values X, Y, Z, Xn, Yn and Zn for (U1, V1) and (U1, V3) are described for completeness, but do not as such form part of the present invention, and other methods could be used. Further details of the Cox-DeBoor procedure described above may be be found, however, in U.S. Pat. No. 5,278,948 and the references cited therein.

Figure 21:
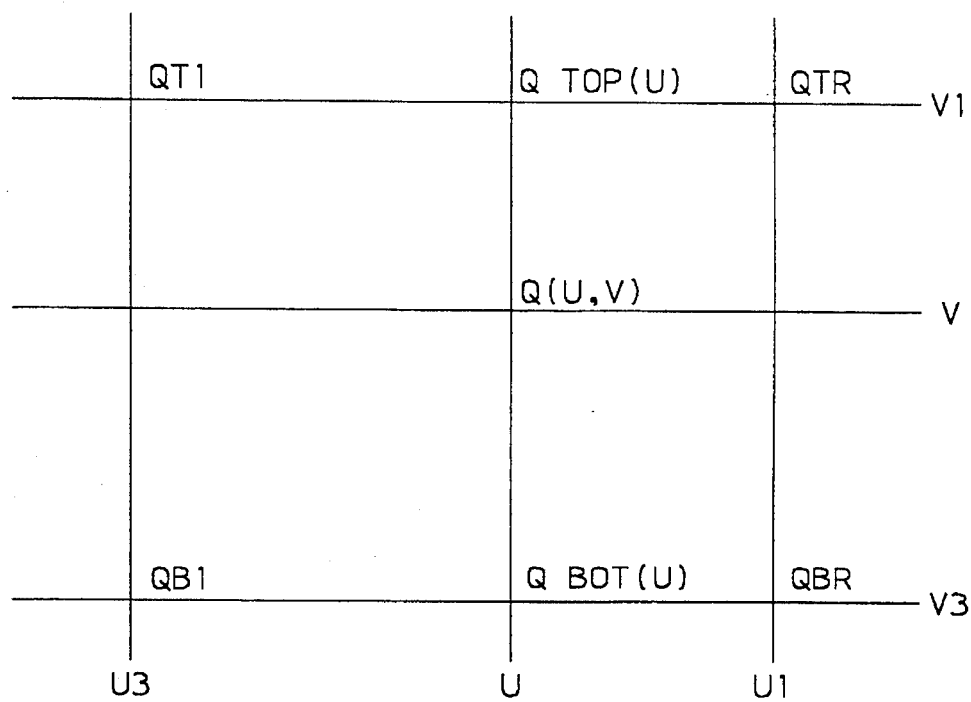
FIG. 21 is an illustration, in UV parameter space, of the bilinear interpolation method used to evaluate vertices within a UV rectangle.

If there are n U intervals in the current U span, then the U interval loop is entered n+1 times, each time generating X, Y and Z coordinates and X, Y and Z normal vector components for top and bottom V interval values V1 and V3 and right U interval value U1. (The loop is entered n+1 times because there are n+1 values defining the beginning and ending points of n U intervals). These twelve quantities may be indicated generically as Qt and Qb, where t stands for top, b stands for bottom, and Q stands for X, Y, Z, Xn, Yn or Zn. On each pass, in preparation for generation of the polygon vertex data, the newly calculated values Qt and Qb are stored as quantities Qtr (top right) and Qbr (bottom right), while the values Qtr and Qbr stored on the previous pass are stored as quantities Qtl (top left) and Qbl (bottom left). As a result of this process, on the second and each subsequent pass through the U interval loop, there will be stored four sets of quantities Qtl, Qtr, Qbl and Qbr, corresponding respectively to the X, Y and Z vertices and normal vector data for the top left, top right, bottom left and bottom right vertices of the current UV rectangle. These quantities constitute the vertex data for the vertices of the current UV rectangle and are used to generate vertex data for other vertices created by clipping the trim polygon to the UV rectangle (see FIG. 21).

Figure 18:
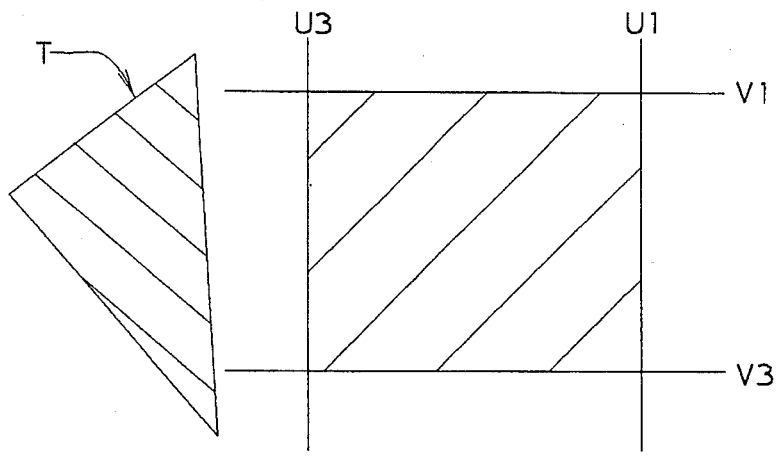
FIG. 18 is an illustration, in UV parameter space, of an instance in which a trim polygon fails to intersect the current UV rectangle.
Figure 19:
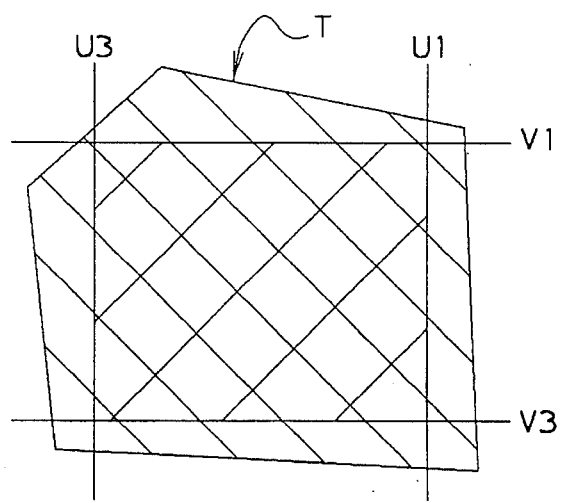
FIG. 19 is an illustration, in UV parameter space, of an instance in which a trim polygon completely includes a UV rectangle.
Figure 20:
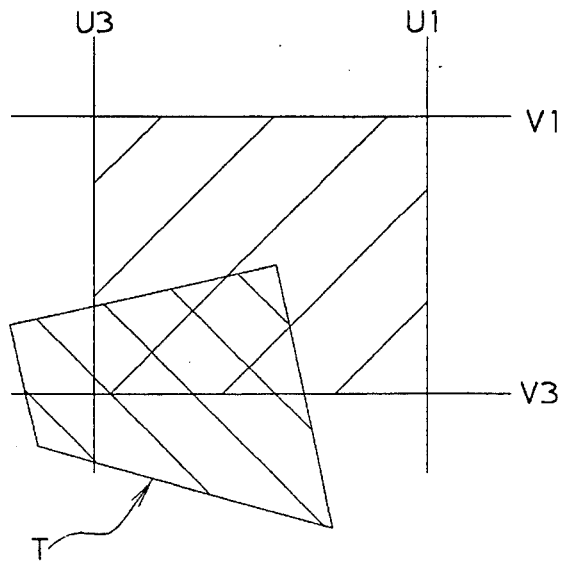
FIG. 20 is an illustration, in UV parameter space, of a trim polygon that intersects the current UV rectangle to form a polygon that is a proper subset of both the trim polygon and the UV rectangle.

After these calculations have been made, the flag Ufrst is again checked to determine whether this is the first pass through the U interval loop for the current U span (1264). If it is, then the flag Ufrst is reset to 0 (1280) as a preliminary to terminating this pass through the loop. If this is not the first pass through the U interval loop for the current U span, then the trim curve polygon, which has previously been clipped to the current V interval, is further clipped to the UV rectangle formed by the intersection of the V interval with the current U interval (272). The result of this UV clipping may be either an empty rectangle if the trimming region does not intersect the UV rectangle (FIG. 18), a full rectangle if the trimming region completely includes the UV rectangle (FIG. 19), or an irregular polygon (FIG. 20). (In FIGS. 18–20 the trim polygons are shown in their unclipped form, although in actuality they have been clipped to the V interval at this point). The X, Y and Z coordinates and normal vector components are calculated for each vertex of the polygon so formed, in a manner to be described further below (1274), and this vertex data is sent to the polygon processor.

The flag Ulast is then tested to determine whether this is the last pass through the U interval loop for the current U span (1278). If so, the U interval loop is ended (1288). Otherwise, the lower limit U3 and upper limit U1 of the current U interval and remaining range Ur of the U span are updated in preparation for another pass through the U interval loop (1282). The range Ur is then tested to see whether it is greater than 0 (1284). If it is, then the routine returns to step 1202 for another pass through the loop. Otherwise, the upper limit U1 for the current U interval is set equal to the upper limit U2 for the span, and the flag Ulast set equal to 1, before returning to step 1202 (1286).

The resulting UV polygon, as well as the corresponding XYZ polygon, may be concave and is processed by the drawing and shading processors 106 in a manner which supports concave polygons. Although the details of the concave polygon processor do not as such form part of the present invention, a suitable such concave polygon processor is disclosed in U.S. Pat. No. 5,303,340.

The coordinates and normal vectors for points on the edges and interior of a UV rectangle may be approximated by linear or bilinear interpolation between the corners. This approximation will benefit the performance of the system because bilinear interpolation requires fewer operations than evaluation of the NURBS equations for these points. This approximation will be accurate as long as the interpolated quadrilaterals are nearly flat, a condition which is also required by the corresponding area fill operations. This condition may be assured by appropriate choices of the surface approximation control values or quality factors.

The vertex data for these edge polygons is preceded by the pipeline command "Start Convex Polygon" or "Start Concave Polygon", based on the value of the flag VCONVEX and the pipeline command "End Polygon" follows the data for the last vertex. If no convexity tests are performed, then the condition VCONVEX=0 (false) is implied and the command "Start Concave Polygon" is used for every polygon. If a UV rectangle contains of 2 or more disjoint regions, the data for these regions may be separated by the pipeline command "Break Polygon".

Prior to clipping the UV vectors to the current U interval the following four lists are constructed:

1. V values of points where a vector crosses the left edge (U=U3) of the current U interval, exclusive of V1 and V3 (top V and bottom V), 2. U values of points with bit MDVTOP=1 and U values within the current U interval, exclusive of U3 and U1 (left and right boundaries), 3. V values of points where a vector crosses the right edge (U=U1) of the current U interval, exclusive of V1 and V3 (top V and bottom V), 4. U values of points with MDVBOT=1 and U values within the current U interval exclusive of U3 and U1 (left and right boundaries).

These lists may be concatenated one after the other following the list of trim curve vertices in local memory 204. These lists will often be empty and rarely contain more than one or two entries. After creating each list, the contents of each list are sorted by increasing value.

If the vector joining two successive vertices crosses the left (U=U3) or right (U=U1) boundaries of the current U interval, a new vertex is created where the vector crosses the boundary. The MOVDRW word associated with each new vertex is assigned the same direction flags (NSDIR, NSDR2, EWDIR, EWDR2) as the preceding vertex, as well as the same values of the VTOP and VBOT flags. The ULFT bit is set to 1 if the new vertex is created at the left boundary (U=U3), and the URGT bit is set if the new vertex is created at the right boundary.

The flags VBOT, VTOP, ULFT and URGT of each vertex obtained from clipping the trim curves to the current U interval are tested to identify vertices which lie on the boundaries of the UV rectangle defined by the current U interval and current V interval. If a vertex does not lie on any boundary of the UV rectangle, then the XYZ coordinates and normal vector of the vertex are determined through bilinear interpolation between the values computed for the corners of the UV rectangle. In this case, the bilinear interpolation is accomplished in three stages (FIG. 21):

$$Qtop(U)=(Qtl*(U1-U)+Qtr*(U-U3))*Du$$

$$Qbot(U)=(Qbl*(U1-U)+Qbr*(U-U3))*Du$$

$$Q(U,V)=(Qtop*(V-V3)+Qbot*(V1-V))*Dv$$

where Q represents each of the six values defined by the XYZ coordinates and normal vector. The subscripts tl, tr, bl, and br represent the values at the top left, top right, bottom left, and bottom right corners of the UV rectangle, and Du and Dv are given by $$Du=1.0/(U1-U3), \text{ and}$$

$$Dv=1.0/(V1-V3).$$

If a vertex lies on one of the four boundaries, as indicated by the flags VTOP, VBOT, ULFT, and URGT, then the XYZ coordinates and normal vector may be determined by a single stage interpolation indicated by one of the following formulas:

If $VTOP=1$: $Q(U,V1)=(Qtr*(U-U3)+Qtl*(U1-U))*Du$,

If $VBOT=1$: $Q(U,V3)=(Qbr*(U-U3)+Qbl*(U1-U))*Du$,

If $URGT=1$: $Q(U1,V)=(Qtr*(V-V3)+Qbr*(V1-V))*Dv$,

If $ULFT=1$: $Q(U3,V)=(Qtl*(V-V3)+Qbl*(V1-V))*Dv$.

The use of a single stage of interpolation instead of three stages not only improves performance by reducing the number of operations required to determine the XYZ coordinates and normal vectors, but also improves the accuracy of the results by eliminating the floating point round-off and truncation errors which could be produced by the unnecessary floating point operations.

If a vertex lies on two of the four boundaries, as indicated by the flags, VTOP, VBOT, ULFT and URGT, then the XYZ coordinates and normal vector may be determined directly by the values for the corresponding corners:

If $VTOP=1$ and $URGT=1$: $Q(U1,V1)=Qtr$,

If $VTOP=1$ and $ULFT=1$: $Q(U3,V1)=Qtl$,

If $VBOT=1$ and $URGT=1$: $Q(U1,V3)=Qbr$,

If $VBOT=1$ and $ULFT=1$: $Q(U3,V3)=Qbl$.

In these cases, avoiding the use of interpolation not only improves performance by reducing the number of operations required to determine the XYZ coordinates and normal vectors, but also improves the accuracy of the results by eliminating the floating point round-off and truncation errors which could be produced by the unnecessary floating point operations. These benefits are especially important for the corner points because the corner points are the most numerous type of UV vertex to be encountered in the processing of most trimmed curved surfaces.

In each of the eight cases where a vertex lies on an edge or corner of the UV rectangle, prior to generating the XYZ coordinates and normal vector, the preceding vertex is also checked for its location with respect to the boundaries of the UV rectangle. If the current and preceding vertices both fall on a common boundary, then the corresponding list of edge crossing points is searched for any points which fall between the current and preceding vertices. The XYZ coordinates and normal vectors are then generated for each such point using the appropriate single-stage interpolation formula.

For example, if the current vertex (Ui, Vi) and the previous vertex (Uj, Vj) both fall on the top boundary (i.e. Vi=Vj=V1), then the set of U parameter values in the list for the top boundary is searched for values of Uk between Ui and Uj, excluding Uk=Ui and Uk=Uj. If Ui>Uj, then the list is searched in order of increasing Uk. If Ui<Uj, then the list is searched in order of decreasing Uk. If Ui=Uj, no search is performed.

Figure 22:
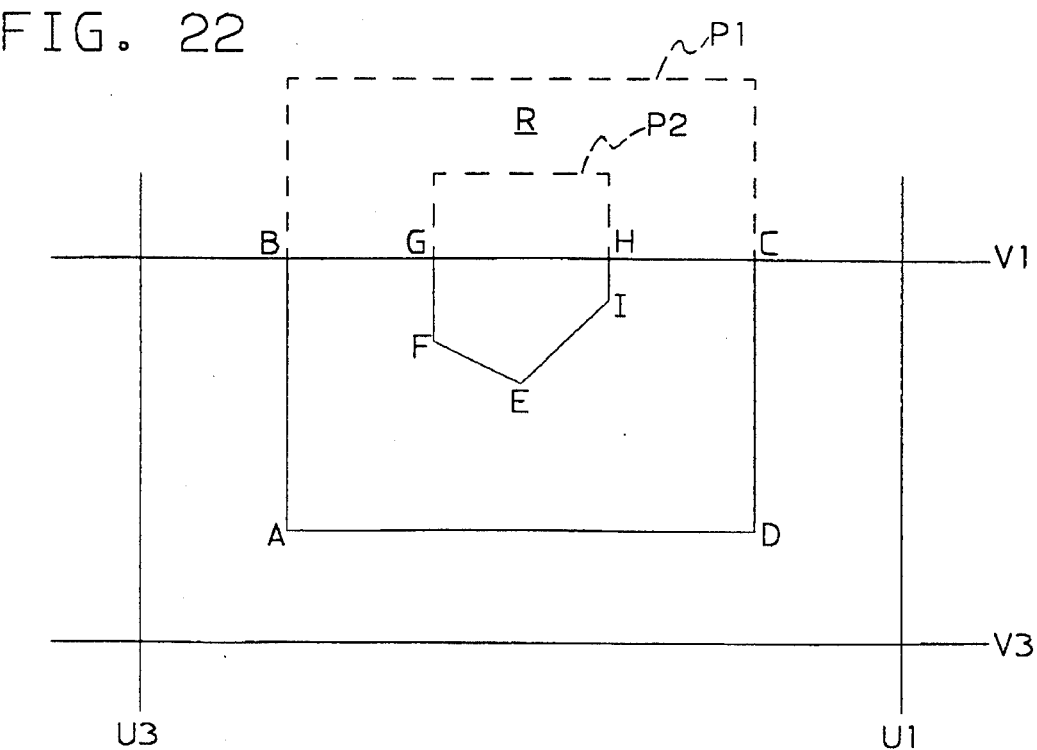
FIG. 22 is an illustration, in UV parameter space, of two overlapping polygons having a common edge portion along an edge of a UV triangle.

The effect of this procedure is illustrated in FIG. 22, which shows a UV rectangle containing two polygonal subareas abcd and efghi which have been clipped at the top boundary (V=V1). Subareas abcd and efghi may have resulted from clipping two trim polygons P1 and P2 (together defining a doughnut-shaped region between the two polygon boundaries) to the V interval V3–V1. Prior to use of this procedure, the first subarea is determined by four vertices labelled as (a,b,c,d), and the second subarea is determined by the five vertices labelled as (e,f,g,h,i). In this case, the U parameter values associated with vertices (g) and (h) (i.e. Ug and Uh) will be placed in the list of Vtop crossing points. Prior to calculating the XYZ coordinates and normal vector for vertex (c), this list is scanned, leading to the introduction of vertices (g) and (h) in that order. As a result, the first subarea will be represented by six vertices (a,b,g,h,c,d).

This procedure prevents the appearance of artifacts along boundaries which are partially shared by two or more subareas, such as the line between vertices (g) and (h) in FIG. 22. In this example, lines (b–c) and (g–h) are perfectly horizontal and colinear in UV parameter space. When the resulting XYZ coordinates are mapped into screen space XY coordinates, the resulting vectors will generally be diagonal. In addition, the errors resulting from mapping each point into screen (pixel) coordinates will be different for each point. Consequently, the vector representing line (g–h) in screen space will no longer be colinear with the vector representing line (b–c), leading to residual (artifact) pixels when the pixels along the (g–h) boundary of the second subarea are subtracted from the pixels along the (b–c) boundary of the first subarea.

What is claimed is:

1. In a computer graphics system having a polygon processor capable of processing concave polygons, a method of rendering a trimmed parametric surface representing a mapping from U and V parametric coordinates to X and Y geometric coordinates, said X and Y geometric coordinates for deriving the location of graphics entities on a computer graphics display, said parametric surface having multiple patches and a trimming region bound by a trim polyline, said method including the steps of:

(a) dividing the parametric surface with multiple patches into a plurality of contiguous U and V intervals intersecting to form a grid of UV rectangles, said trim polyline intersecting a subset of said UV rectangles to divide each of the UV rectangles of the subset into at least one polygon lying within the trimming region and at least one polygon lying outside of the trimming region; and (b) for each V interval intersected by the trim polyline:
  (1) determining vertices of a V polygon lying within the trimming region formed by the intersection of the trim polyline and the V interval;
  (2) determining vertices of U polygons formed by the intersection of the V polygon and said U intervals; and
(c) providing vertex data for said vertices to the polygon processor to render the polygon for said computer graphics display.

2. A method as in claim 1 in which said parametric surface is a NURBS surface.

3. A method as in claim 1 in which said trim polyline is derived from a NURBS curve defined on said surface.

4. A method as in claim 1 in which said parametric surface represents a mapping from U and V parametric coordinates to X, Y and Z geometric coordinates.

5. A method as in claim 4 in which said vertex data includes the X, Y and Z coordinates of said vertices.

6. A method as in claim 4 in which said parametric surface has a defined normal vector for each of said vertices, said vertex data including the X, Y and Z components of the normal vectors for said vertices.

7. In a computer graphics system having a global memory and a graphics processor having a local memory, a method of rendering a trimmed parametric surface representing a mapping from U and V parametric coordinates to X and Y geometric coordinates, said X and Y geometric coordinates for deriving the location of graphics entities on a computer graphics display, said parametric surface having multiple patches and a trimming region bound by a trim polyline defined by vertex data in said global memory, said method including the steps of:
(a) dividing the parametric surface with multiple patches into a plurality of contiguous V intervals which extend across the entire parametric surface;
(b) for each V interval intersected by said trim polyline;
  (1) reading the polyline data stored in said global memory;
  (2) clipping the trim polyline defined by the read data to the V interval to form a V-clipped polyline defined by V-clipped polyline data;
  (3) storing the V-clipped polyline data in said local memory; and
  (4) processing said V interval with said graphics processor using said stored V-clipped polyline data to render said trimmed parametric surface for said computer graphics display.

8. A method as in claim 7 in which said parametric surface is a NURBS surface.

9. A method as in claim 7 in which said trim polyline is derived from a NURBS curve defined on said surface.

10. A method as in claim 7 in which said processing step includes the further steps of:
(a) dividing the V interval into a plurality of contiguous UV rectangles; and
(b) for each UV rectangle intersected by the V-clipped polyline;
  (1) clipping the V-clipped trim polyline to the UV rectangle to form a UV-clipped polyline defined by UV-clipped polyline data;
  (2) storing the UV-clipped polyline data in said local memory; and
  (3) processing the UV rectangle using said stored UV-clipped polyline data to render said trimmed parametric surface.

11. In a computer graphics system having a polygon processor capable of processing concave polygons, apparatus for rendering a trimmed parametric surface representing a mapping from U and V parametric coordinates to X and Y geometric coordinates, said X and Y geometric coordinates for deriving the location of graphics entities on a computer graphics display, said parametric surface having multiple patches and a trimming region bound by a trim polyline, said apparatus comprising:
(a) means for dividing the parametric surface having multiple patches into a plurality of contiguous U and V intervals intersecting to form a grid of UV rectangles, said trim polyline intersecting a subset of said UV rectangles to divide each of the UV rectangles of the subset into at least one polygon lying within the trimming region and at least one polygon lying outside of the trimming region; and
(b) means for processing each V interval intersected by the trim polyline comprising:
  (1) means for determining vertices of a V polygon lying within the trimming region formed by the intersection of the trim polyline and the V interval;
  (2) means for determining vertices of U polygons formed by the intersection of the V polygon and said U intervals; and
(c) means for providing vertex data for said vertices to the polygon processor to render the polygon for said computer graphics display.

12. In a computer graphics system having a polygon processor, a method of rendering a trimmed parametric surface representing a mapping from U and V parametric coordinates to X and Y geometric coordinates, said X and Y geometric coordinates for deriving the location of graphics entities on a computer graphics display, said parametric surface having multiple patches and a trimming region bound by a trim polygon, said method including the steps of:
(a) dividing the parametric surface having multiple patches into a plurality of contiguous U and V intervals intersecting to form a grid of UV rectangles, said trim polygon intersecting a subset of said UV rectangles to form UV polygons, said UV polygons including polygons formed by the intersection of a boundary of said trimming polygon with said UV rectangles;
(b) clipping said trim polygon to said V intervals to form V-clipped polygons and clipping said V-clipped polygons to each of said U intervals to form said UV polygons; and
(c) providing vertex data for the vertices of said UV polygons to the polygon processor to render said UV polygons for said computer graphics display.

13. A method as in claim 12 including the step of clipping said trimming polygon to each of said UV rectangles to form said UV polygons.

14. A method as in claim 12 including the steps of evaluating the parametric surface at the vertices of said UV rectangles to obtain UV rectangle vertex data and determining the UV polygon vertex data from said UV rectangle vertex data.

15. A method as in claim 14 including the steps of testing each vertex of said UV polygons to determine whether it lies along an edge of a UV rectangle and determining the vertex data for said vertex from said UV rectangle vertex data by bilinear interpolation if it does not lie along such edge.

16. A method as in claim 14 including the steps of testing each vertex of said UV polygons to determine whether it coincides with a vertex of a UV rectangle and determining the vertex data for said vertex from said UV rectangle vertex data by interpolation if it does not coincide with such vertex.

17. A method as in claim 12 including the steps of determining, for each edge of a first UV polygon lying along an edge of a UV rectangle including that polygon, whether any vertex of a second UV polygon within said rectangle lies along said polygon edge and, if so, including any such vertex as a vertex of the first polygon.

18. In a computer graphics system having a global memory and a graphics processor having a local memory, apparatus for rendering a trimmed parametric surface representing a mapping from U and V parametric coordinates to X and Y geometric coordinates, said X and Y geometric coordinates for deriving the location of graphics entities on a computer graphics display, said parametric surface having multiple patches and a trimming region bound by a trim polyline defined by vertex data in said global memory, said apparatus comprising:

(a) means for dividing the parametric surface with multiple patches into a plurality of contiguous V intervals which extend across the entire parametric surface;

(b) means for processing each V interval intersected by said trim polyline comprising;

(1) means for reading the polyline data stored in said global memory;

(2) means for clipping the trim polyline defined by the read data to the V interval to form a V-clipped polyline defined by V-clipped polyline data;

(3) means for storing the V-clipped polyline data in said local memory; and (4) means for processing said V interval with said graphics processor using said stored V-clipped polyline data to render said trimmed parametric surface for said computer graphics display.

19. In a computer graphics system having a polygon processor, apparatus for rendering a trimmed parametric surface representing a mapping from U and V parametric coordinates to X and Y geometric coordinates, said X and Y geometric coordinates for deriving the location of graphics entities on a computer graphics display, said parametric surface having multiple patches and a trimming region bound by a trim polygon, said apparatus comprising (a) means for dividing the parametric surface having multiple patches into a plurality of contiguous U and V intervals intersecting to form a grid of UV rectangles, said trim polygon intersecting a subset of said UV rectangles to form UV polygons, said UV polygons including polygons formed by the intersection of a boundary of said trimming polygon with said UV rectangles;

(b) means for clipping said trim polygon to said V intervals to form V-clipped polygons and clipping said V-clipped polygons to each of said U intervals to form said UV polygons; and (c) means for providing vertex data for the vertices of said UV polygons to the polygon processor to render said UV polygons for said computer graphics display.

\* \* \* \* \*